(12) United States Patent
Lin

(10) Patent No.: US 9,228,683 B2
(45) Date of Patent: Jan. 5, 2016

(54) FLANGED TUBE APPARATUS

(71) Applicant: ZhenWu Lin, Pasadena, CA (US)

(72) Inventor: ZhenWu Lin, Pasadena, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 79 days.

(21) Appl. No.: 14/138,091

(22) Filed: Dec. 22, 2013

(65) Prior Publication Data

US 2015/0174514 A1 Jun. 25, 2015

(51) Int. Cl.
| | |
|---|---|
| *F16L 23/04* | (2006.01) |
| *B01D 46/00* | (2006.01) |
| *B01D 35/30* | (2006.01) |
| *F16L 23/06* | (2006.01) |
| *B01D 63/00* | (2006.01) |
| *B01D 29/01* | (2006.01) |
| *B01D 46/52* | (2006.01) |
| *B01D 53/04* | (2006.01) |
| *B01D 63/14* | (2006.01) |
| *B01D 15/10* | (2006.01) |

(52) U.S. Cl.
CPC .............. *F16L 23/04* (2013.01); *B01D 15/10* (2013.01); *B01D 29/016* (2013.01); *B01D 35/30* (2013.01); *B01D 46/0002* (2013.01); *B01D 46/0012* (2013.01); *B01D 46/521* (2013.01); *B01D 53/0415* (2013.01); *B01D 63/00* (2013.01); *B01D 63/14* (2013.01); *F16L 23/06* (2013.01); *B01D 2253/102* (2013.01); *B01D 2253/206* (2013.01); *B01D 2265/02* (2013.01)

(58) Field of Classification Search
CPC .......... F16L 21/06; F16L 23/00; F16L 23/04; F16L 23/06; F16L 23/08; F16L 23/10; F16L 23/18; F16L 23/22; B01D 46/0002; B01D 46/0012; B01D 2265/02; B01D 2265/028; B01D 2265/029
See application file for complete search history.

(56) References Cited

U.S. PATENT DOCUMENTS

| | | | | |
|---|---|---|---|---|
| 4,573,717 | A | * | 3/1986 | Peacock ......................... 285/365 |
| 5,895,695 | A | | 4/1999 | Rowley |
| 6,079,509 | A | | 6/2000 | Bee et al. |
| 6,547,255 | B1 | | 4/2003 | Donaway et al. |
| 6,758,500 | B2 | | 7/2004 | Lehnhardt |
| 7,726,702 | B2 | | 6/2010 | Schulze et al. |
| RE44,424 | E | | 8/2013 | Barnwell |
| 2002/0041099 | A1 | * | 4/2002 | Grun ............................. 285/364 |
| 2008/0252075 | A1 | | 10/2008 | Eriksson et al. |
| 2010/0230962 | A1 | | 9/2010 | Bongiorno |
| 2011/0163541 | A1 | * | 7/2011 | Bronnert ....................... 285/365 |
| 2013/0264265 | A1 | | 10/2013 | Lin |

* cited by examiner

*Primary Examiner* — Robert Clemente
(74) *Attorney, Agent, or Firm* — Lorusso & Associates

(57) ABSTRACT

An improved flanged tube assembly with insert-reinforced tube flanges to prevent tube flange deformation and leakage when subjected to high compressive forces as well as sustained high-temperature procedures. The flange inserts are configured to form the flange portion of a flanged tube, or configured to provide structural support to the portions of the flange integral to the associated tube. The inserts may be metallic or polymer based and formed with various structural features to create a mechanical lock between the insert and the material used to make the tube/flange assembly. The inserts can be incorporated into the tube flanges so as to provide the desired support without being exposed to any fluids and/or gases that may flow through the reinforced tube/flange assemblies.

64 Claims, 27 Drawing Sheets

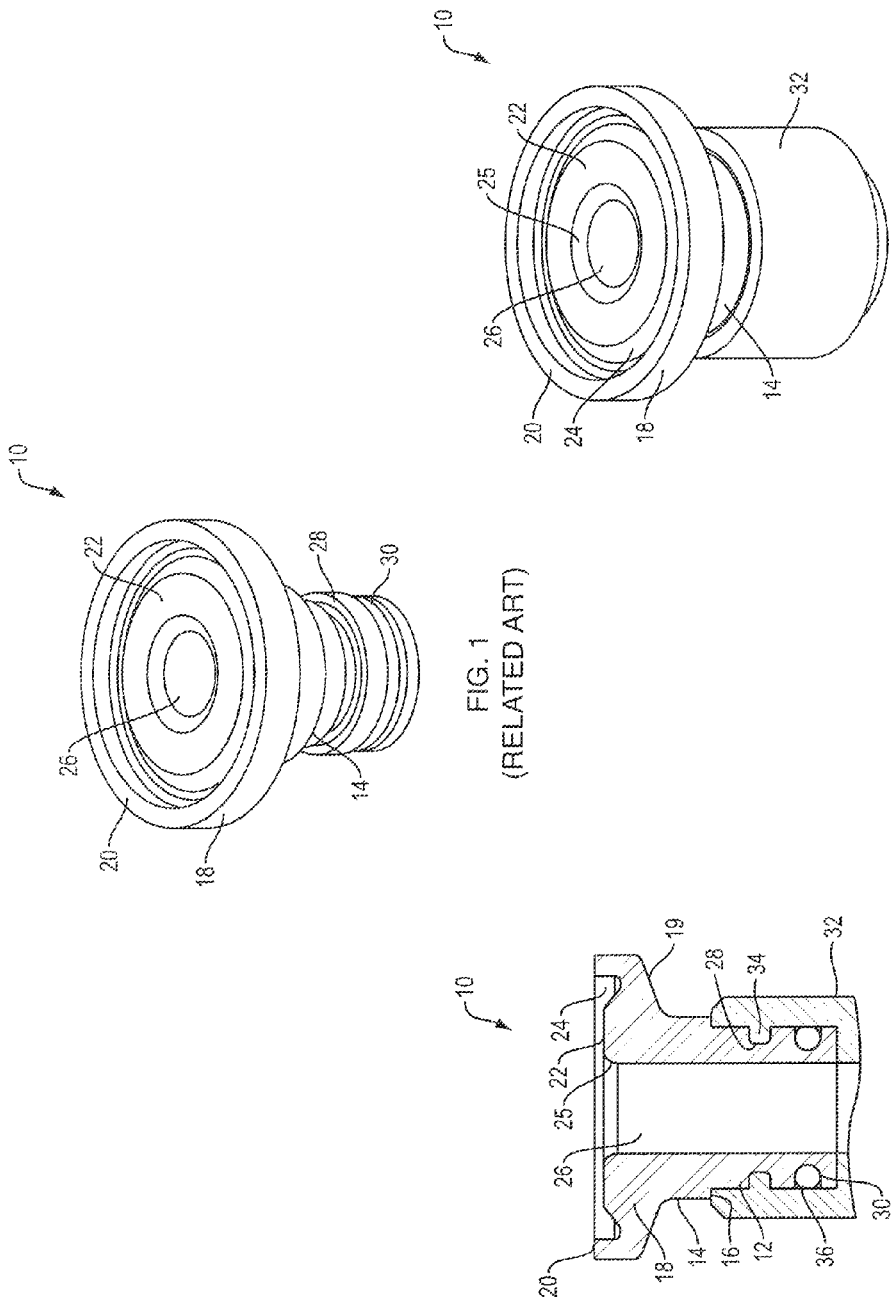

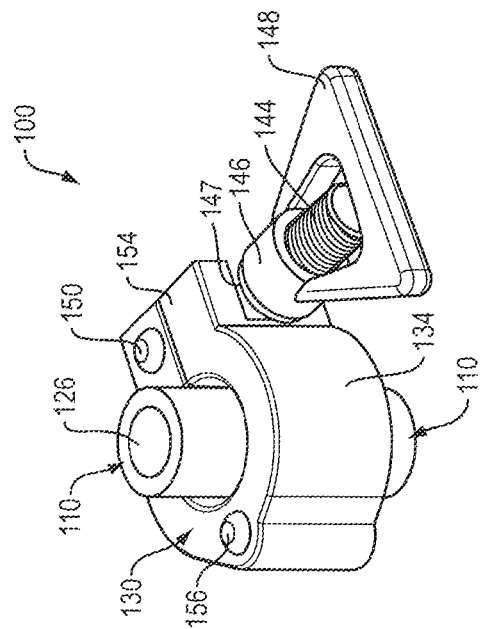
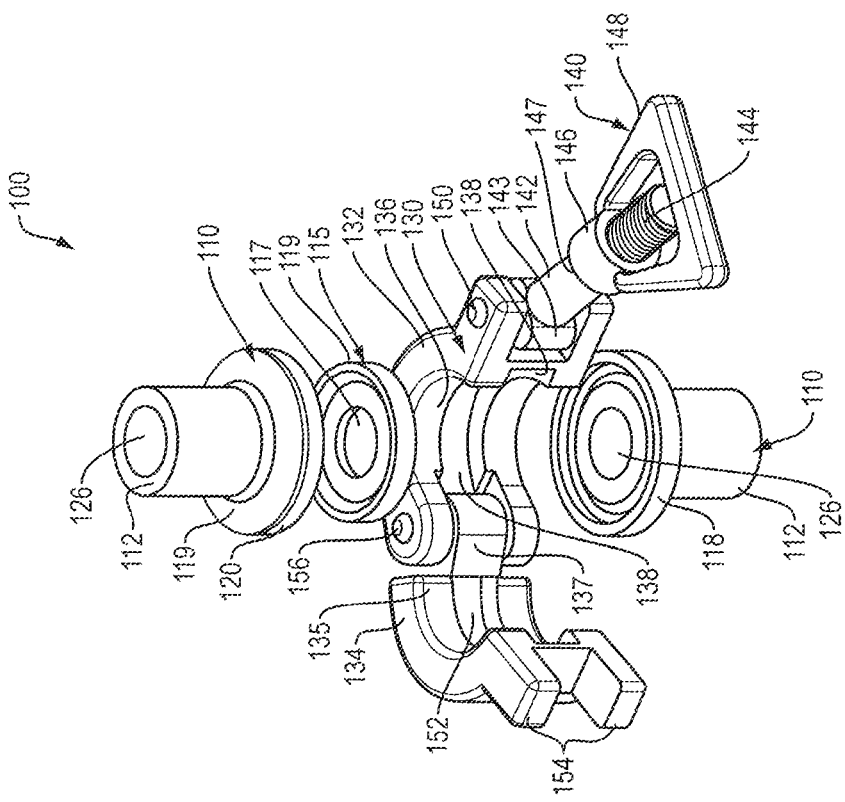

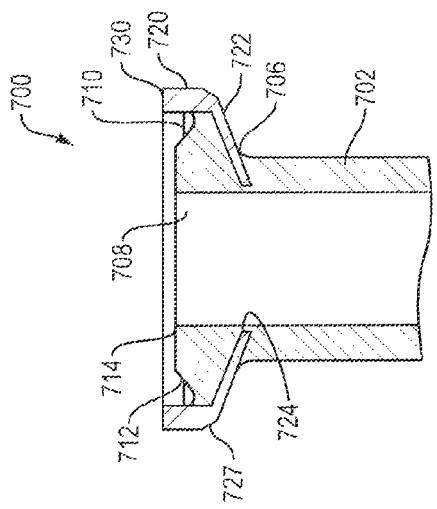
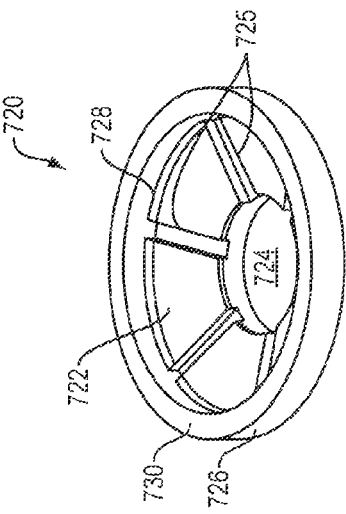
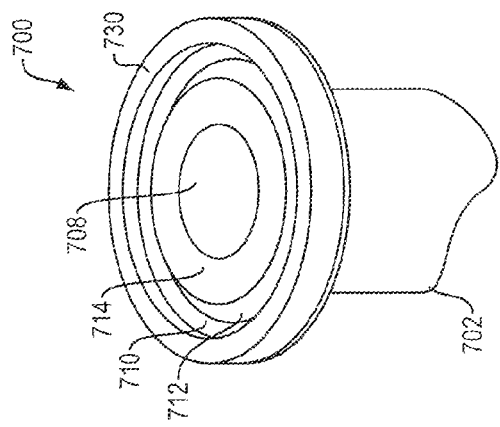

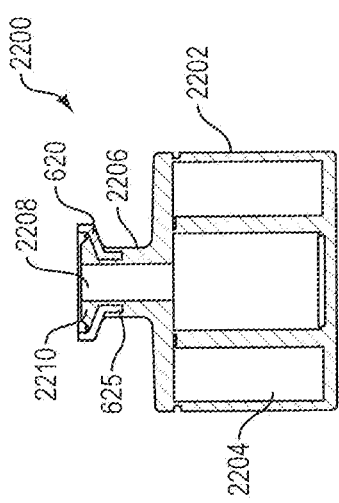
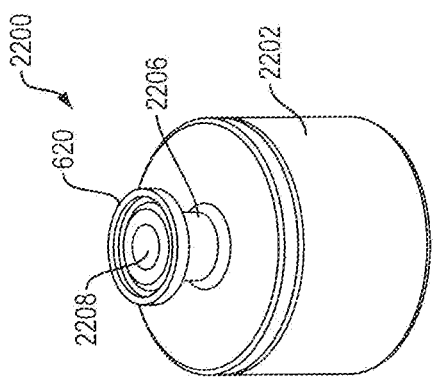
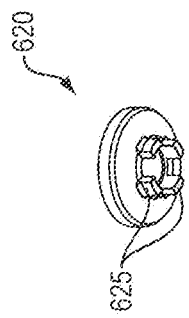
FIG. 57
FIG. 58
FIG. 59

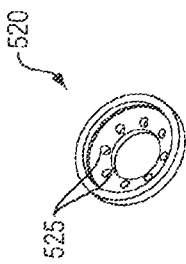
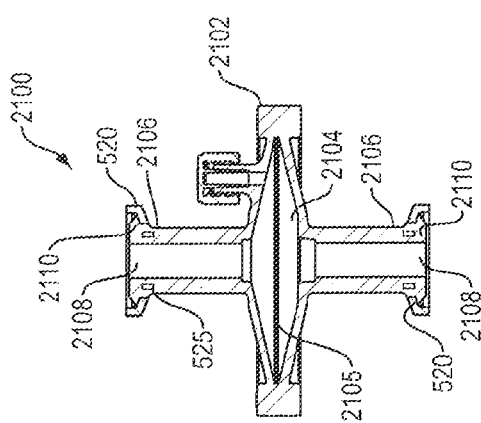
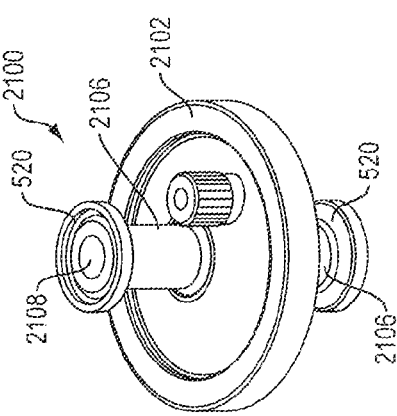

FLANGED TUBE APPARATUS

FIELD OF THE DISCLOSURE

The disclosure relates to improvements to clamped assemblies having flanged tubes in filtration and piping systems. More particularly, the disclosure concerns flange reinforcements for flanged tubes, pipes, filter housing ports and standalone tube fittings used in tri-clamp assemblies and the like to improve durability and adaptability to high temperature environments such as those experienced in temperature-based sterilization procedures and to simplify flange reinforcement design.

BACKGROUND OF THE DISCLOSURE

Flanged tubes, such as those used in tri-clamps, and similar to the novel one shown generally in FIG. 7, include four basic components (such as tri-clamp couplings constructed according to ISO 2852, DIN 32676, BS 4825). A pair of tubes 110 having flanged ends configured to register against one another and to enclose a sealing gasket 115 to create an airtight and fluid-tight seal. The flanges are maintained in registration with a clamp structure 130 commonly comprising a pair of hinged semi-circular, or 3-segment, clamping segments with corresponding locking structures at ends opposite a hinged end. The locking structures may include a threaded bolt and threaded bore in one clamping segment and corresponding registration surfaces in the second clamping segment. The flanges may have radially sloped surfaces on a side of the flanges opposite the surfaces that register against one another when two tubes are aligned. The slopes decrease away from the tube body from which the flanges extend. When the clamp structure is secured to the mated flanges, tightening the clamp structure against the paired flanges pulls the semi-circular clamping segments against the sloped surfaces of the flanges. Increased tightening increases the axial and radial pressures exerted against the flanges that cause the flanges to be pressed together in an axial direction as well as a radial direction. The more the semi-circular segments are torqued together, the more tightly the flanged tubes are secured together.

Tri-clamp tubes and their associated flanges are often fabricated from metals, such as 316L stainless steel, and used in sanitary piping and filtration systems. Those metal based tri-clamp coupling systems are often used repeatedly and can sustain various high temperature and high pressure applications and processes. Polymer materials (e.g., polypropylene, polysulfone. PVDF, etc) used for polymer-based tri-clamp tubes and associated flanges are becoming necessary and popular in single-use disposable piping, filter capsules and bio-containers used in manufacturing and processing applications in the bio-pharmaceutical, medical, and food and beverage industries. The polymer materials used for these structures offer many advantages including ease of manufacture, good structural integrity, durability and lowered susceptibility to bacterial growth. There are, however, drawbacks to use of polymeric materials when the application to which the tri-clamp construction is used requires regular and periodic sterilization procedures such as those used in the pharmaceutical industry.

Chief among the drawbacks is the propensity of some of the polymer-based flanges to deform during prolonged autoclaving and other high temperature sterilization techniques. This is due at least in part to the thermoplastic nature of the polymer materials commonly used. Even though the sterilization procedures may be performed with the tri-clamp apparatus in a clamped condition, the flanged portions of the tri-clamp coupling assembly can deform when heated and cooled cyclically. The deformation can lead to improper sealing between mated flanges as well as a reduction in structural integrity after the sterilization procedure. What is needed is a disposable tri-clamp tube flange that can withstand repeated and prolonged high-temperature sterilization procedures without any degradation of structural integrity, flange strength or ability to maintain an airtight and fluid-tight seal.

One approach to correct this problem is to incorporate a metallic insert into the end of a tube to function as the flange portion secured in a tri-clamp. As shown in FIGS. 1-3, a tube insert, shown designated generally as 10, includes a generally cylindrical body 12 with a radially extended annular flange 18. Flange 18 includes an annular rim 20 that forms the perimeter surface to which the clamping arms of a tri-clamp register against. A tapered surface 19 of flange 18 slopes radially outwardly from body 12 with the taper becoming thinner toward the outer perimeter of flange 18. This configuration provides a means to impart an axial force on the flange as it registers against a mated flange of a second tube. As the clamp is tightened, the clamping arms impart a radially inwardly directed force against flange rims 20. As portions of the clamping arms in registration with sloped surfaces 19 are further tightened, the clamping arms slide along the sloped surfaces and impart an axial force that pushes the mated flanges in opposing axial directions to press the mated flanges against each other.

To secure this type of flange insert to the tube, a series of features are needed to secure and seal the metallic insert to the polymeric tube. As the materials used to make the metallic insert and the polymer-based tube differ and do not adhere to each other, mechanical interlocking means are necessary to secure the components together.

A cylindrical transition body segment 14 is formed between, and connects, flange 18 and body 12. At the juncture of the flange 18 and segment 14, an annular shoulder 16 is formed to act as a stop and registration surface when flange 18 is put in a mold used to form tube 32. An annular locking channel 28 is formed on an outer surface of body 12 proximal to shoulder 16. When polymer material is poured or injected into a mold used to form tube 32, the material flows into channel 28 and forms an insert restriction ring 34, integral to tube body 12 that substantially prevents axial movement of flange 18 relative to tube 32. A second annular seal channel 30 is formed toward a distal end of flange 18 to receive an O-ring 36. O-ring 36 is placed in channel 30 prior to the placement of flange 18 in the tube mold. Once the tube material is poured and cured, O-ring 36 ensures an airtight seal is maintained between an inner wall of tube 32 and an outer wall of flange body 12. The presence of the O-ring is of particular importance in this configuration as the materials used for the flange and the tube expand and contract at different rates and to different extents when cycled through periods of heating and cooling such as would be expected in a heat-based sterilization procedure. The presence of the O-ring ensures a substantially air-tight seal is maintained between the registered surfaces when undergoing cycles of heating and cooling.

This configuration does address problems with flange deformation and seal failure, but presents an additional set of issues that make the solution less than desirable. The first issue is the exposure of the metallic flange to the fluids and/or gases introduced into the tube/flange assembly when assembled to a second tube secured with the tri-clamp. Due to this exposure, the materials used for the flange may have to be selected so as not to react with the fluids and/or gases. This potentially limits the selection of materials that could be used to construct the metallic flange. As the flange material differs from the tube material, fluids and/or gases that may be compatible with the tube polymer material may not be suitable for exposure to the metallic material thereby limiting the range of fluids and/or gases that may be used in the apparatus having the tri-clamp.

A second problem is the need for tight dimensional tolerances between the tube and flange segment to achieve a commercially acceptable seal between the parts that must be maintained through cycles of use, cleaning and sterilization. The relatively complicated construction also adds considerably to the cost of producing the flange.

Another approach taken to solve the flange failure issue is to incorporate a cylindrical support into the end of the tube, such as shown in FIGS. 4-6. A modified tube/flange/insert assembly shown designated generally as 50 includes a cylindrical tube body 52 with a radially extending annular flange 54. A metallic cylindrical insert 56 is secured in the end of tube 52 so as to be slightly below the surface defined by a top annular surface 62 of flange 54. A tri-clamp gasket channel 58 combines with a gasket seal face 60 to provide a surface against which a tri-clamp gasket can seal.

The inner diameter of insert 56 is dimensioned to be substantially equal with the inner diameter of tube 52. This ensures a smooth transition from the tube body to the insert so as not to impede fluid and/or gas flow through the tube. Although this configuration provides additional support for the flanged tube end, the material comprising the annular flange outside the diameter of the insert does not benefit from the insert's support. The radially distant flange portions are subject to the same issues regarding flange deformation and potential leakage.

What is needed is a simplified flange insert that eliminates the need for accessory sealing means, e.g., O-rings, to ensure a proper, substantially airtight seal between the insert and the tube material. What is needed also is an insert that can be implemented in a manner to prevent any contact with fluids and/or gases flowed through the tubes and tri-clamp apparatus, or any similar apparatus such as a flanged filter housing. What is needed further is a means to secure a flange insert to accommodate expansion and contraction events due to heat-based sterilization procedures without compromising the seal between mated tube flanges and without any substantial reduction in the structural integrity provided by the insert. These and other objects of the disclosure will become apparent from a reading of the following summary and detailed description of the disclosure.

SUMMARY OF THE DISCLOSURE

In one aspect of the disclosure, a metallic insert is molded into, or secured to, a tube flange, pipe flange, filter housing fitting, standalone tube fitting, or other similar fitting such as a tri-clamp tube flange to enhance structural integrity. As used herein, tube shall mean a substantially hollow tube including a tri-clamp tube, a pipe and/or a filter housing port, cartridge filter tri-clamp adapters, disc capsule filter tri-clamp adapters, capsule filters with tri-clamp adapters, and a stand-alone flanged fitting, separate from, or integrated with, a larger assembly. As further used herein, flange shall mean a radially extended portion of an end of a tube, or any derivation of a tube defined above. The insert is configured and dimensioned to be substantially enveloped by the material used to form the tube and associated flange. In an alternative embodiment, the insert can be formed from a polymer material different from the material used for the tube and flange to improve structural integrity during sterilization events.

In another aspect of the disclosure, the insert is secured to the flange by over-molding about a central bore of the insert. In this configuration, the insert is mechanically secured to the flange. An outer portion of the insert may be exposed and function as a registration surface to register against a second corresponding tube/flange subassembly as well as the clamp segment of a tri-clamp assembly.

In a yet further aspect of the disclosure, the insert is formed with one or more perforations in the body of the insert to permit polymer material used to form the tube/flange assembly to flow into the perforation(s) as well as about the insert portions defining a central bore so as to lock the insert in the flange. The insert becomes spatially secured and fixed to the flange once the polymer material cures.

In a still further aspect of the disclosure, a central bore of the insert is modified to include eccentrically shaped cutouts. The eccentricities create a non-uniform, non-linear border defining the central bore. Polymer material used to make the tube/flange assembly is flowed over the non-linear border so as to register against a bottom surface, a top surface, and portions defining the central bore of the insert so as to lock the spatial orientation of the insert relative to the tube/flange assembly when the polymer cures.

In yet another aspect of the disclosure, an insert is formed with one or more posts extending from a bottom surface of the insert. Polymer material used to make the tube/flange assembly is flowed over the post(s) as well as an inner portion of the insert. The insert is locked in a spatial orientation with the tube/flange assembly when the polymer cures.

In still another aspect of the disclosure, an insert is formed with one or a series of regularly or irregularly repeating surface structures, e.g., radially extending ridges or channels, on a bottom surface and/or a top surface of the insert. Polymer material used to form the tube/flange assembly flows over the bottom and top surfaces of the insert as well as an inner portion of the insert that defines a central insert bore to lock the insert in place in the flange when the polymer cures. The surface structures create a mechanical lock and prevent rotational movement of the insert in the flange when the tube/flange/insert assembly is exposed to high-heat and/or pressure sterilization procedures. These and other aspects of the disclosure will become apparent from a review of the appended drawings and a reading of the following detailed description of the disclosure.

BRIEF DESCRIPTION OF THE DRAWINGS

FIG. 1 is a top perspective view of a related art tri-clamp tube flange insert.

FIG. 2 is a side sectional view of the tube flange insert shown in FIG. 1.

FIG. 3 is a top perspective view of an assembled tri-clamp tube with flange insert as shown in FIGS. 1 and 2.

FIG. 7 is an exploded perspective view of a tri-clamp assembly with tube/flange/insert subassemblies according to one embodiment of the disclosure.

FIG. 8 is a perspective view of the tri-clamp assembly shown in FIG. 7.

FIG. 24 is a side sectional view of a tube/flange/insert subassembly according to a still further embodiment of the disclosure.

FIG. 25 is a top perspective view of the tube/flange/insert subassembly shown in FIG. 24.

FIG. 26 is a top perspective view of the flange insert according to the embodiment shown in FIG. 24.

FIG. 57 is a side sectional view of a filter cartridge with a reinforced flanged tri-clamp adapter according to a still further embodiment of the disclosure.

FIG. 58 is a top perspective view of the filter cartridge shown in FIG. 57.

FIG. 59 is a top perspective view of the flange insert according to the embodiment shown in FIG. 57.

FIG. 72 is a side sectional view of a disc capsule filter with a reinforced flanged tri-clamp adapter according to a yet further embodiment of the disclosure.

FIG. 73 is a top perspective view of the disc capsule filter shown in FIG. 72.

FIG. 74 is a top perspective view of the flange insert according to the embodiment shown in FIG. 72.

DETAILED DESCRIPTION OF THE DISCLOSURE

Figure 6:
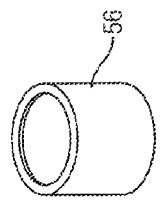
FIG. 6 is a top perspective view of the flange insert shown in FIG. 4.
Figure 4:
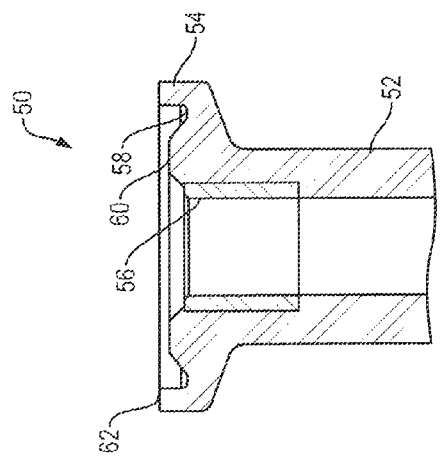
FIG. 4 is a side sectional view of another related art tri-clamp tube flange/insert assembly.
Figure 5:
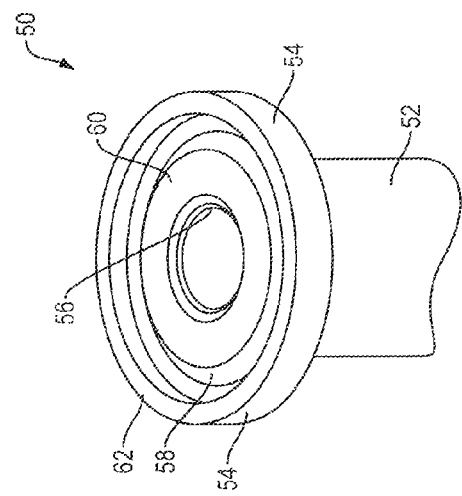
FIG. 5 is a top perspective view of the tube flange/insert assembly shown in FIG. 4.

Referring to FIGS. 7 and 8, in one aspect of the disclosure, a tri-clamp assembly shown designated generally as 100 includes a pair of flanged tubes 110, a gasket 115 and a clamp structure 130. The tubes 110 each have a cylindrically-shaped tube body 112, a lumen 126 defined by body 112 and a radially extending annular flange 118 formed on each tube's end. A flange insert (not shown, but various embodiments of which are disclosed below), is secured in each flange 118. Each flange 118 has portions that define an annular channel for receiving tri-clamp gasket 115.

Gasket 115 is a substantially circular disc with an annular perimeter wall 120 that has raised perimeter shoulders that extends axially from the plane of the gasket body in both axial directions. The axially extended shoulders 119 are configured and dimensioned to fit within the channels formed in flanges 118. An inner portion of the gasket body defines a centrally located gasket bore 117 that permits gases and/or fluids to flow substantially unimpeded from one flanged tube to the other.

To secure flanged tubes 110 and gasket 115, clamp 130 is structured to provide compressive forces in both radial and axial directions. Clamp 130 includes a pair of hinged clamp segments, a first clamp segment 132 and a second clamp segment 134. Each segment has corresponding features to permit the segments to be secured about the pipe flanges. First segment 132 includes a curved body 136 with portions defining a curved slot 138 dimensioned and configured to receive mated tube flanges. A first end of segment 132 is formed with a slot to receive portions of second segment 134 described below. Aligned bores formed in the slot defining extensions are configured and dimensioned to receive a hinge pin 156 used to secure the clamp segments and to permit the segments to rotate about the hinge pin toward and away from each other with respect to the ends distal from the hinged ends.

A second end of segment 132 is also formed with a slot to receive portions of a locking shaft assembly shown designated generally as 140 and described more fully below. A second set of aligned bores formed in the slot defining extensions of the second end are configured and dimensioned to receive a second hinge pin 150 used to secure the locking shaft and to permit first segment 132 and shaft assembly 140 to rotate about hinge pin 150.

Second segment 134 includes a curved body 135 with portions defining a second curved slot 152 corresponding to slot 136 and also dimensioned and configured to received approximately half of the mated tube flanges. A first end of segment 134 is formed with an extension tab 137 dimensioned and configured to fit between the slot defining extensions of segment 132. Tab 137 is formed with a bore dimensioned to receive hinge pin 156. Tab 137 rotates freely between the slot defining extensions.

A second end of segment 134 is formed with substantially parallel locking tabs 154 that define a slot for receiving a section of locking shaft 140. Shaft 140 is shown engaged with tabs 154 in FIG. 8.

Locking assembly 140 includes a substantially cylindrical shaft 142 with threading 144 formed on one end. A second end is formed with a flattened anchor tab 143 configured and dimensioned to fit between the slot defining extensions of first segment 132. A bore is formed in tab 143 to receive second hinge pin 150. When assembled to the slot defining extensions, tab 143 rotates freely between the extensions.

Secured to the threaded end of shaft 142 is locking knob 148. Knob 148 is formed with a main body 146 that defines a treaded bore dimensioned to receive the treaded end of shaft 142. Threading corresponding to threading 144 is formed in the portion of main body 146 defining the bore to permit knob 144 to be rotated about shaft 142 so as to compress the clamp segments together when registered against the clamp segments. A main body end surface 147 registers against tabs 154.

To assemble the tri-clamp, flanged tubes 110 are aligned with clamp gasket 115 secured in the channels formed in flanges 118 to receive the gasket. Once the aligned flanges are positioned together, the clamp segments of clamp assembly 130 are placed about the flanges so that the channels formed in the clamp segments receive the mated flanges. The clamp segments are then rotated about hinge pin 156 so as to engage the entire circumference of the mated flanges. Once the clamp segments have been rotated to a fully closed position, locking assembly 140 is rotated so that shaft 142 is positioned between tabs 154. Locking knob 144 is then rotated to register against tabs 154 to apply a radial clamping force against aligned flanges 118. Due to the sloped surfaces formed on the flanges as previously described, the compressive force applied by torqueing knob 144 onto shaft 142 also imparts an axial force that drives the mated flanges together. In doing so, gasket 115 is compressed between the mated flanges and forms the desired airtight seal. To disassemble the tri-clamp, knob 144 is rotated so as to travel toward a distal end of shaft 142 to permit the clamp segments to be separated by rotating about hinge pin 156 away from each other.

Figure 11:
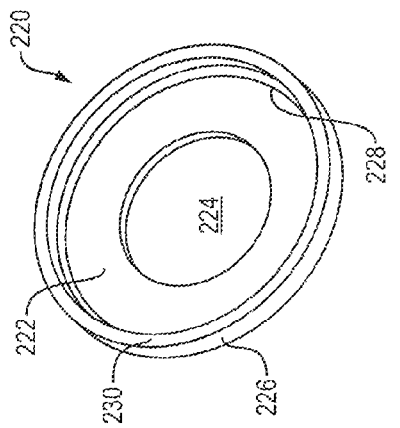
FIG. 11 is a top perspective view of a flange insert according to the embodiment of the disclosure shown in FIG. 9.
Figure 9:
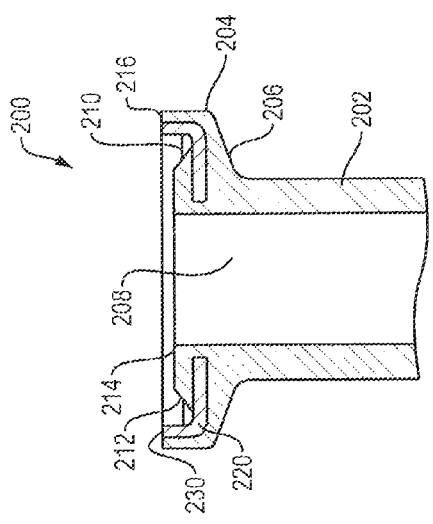
FIG. 9 is a side sectional view of a tube/flange/insert subassembly according to one embodiment of the disclosure.
Figure 10:
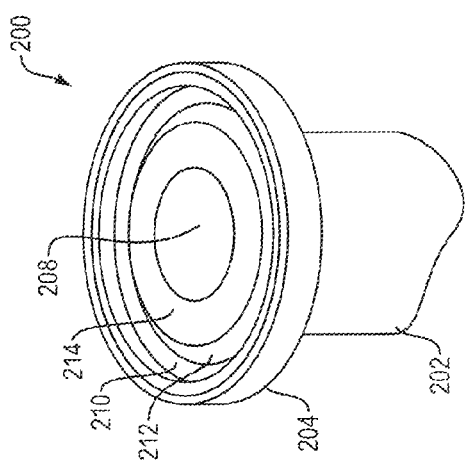
FIG. 10 is a top perspective view of the tube/flange/insert subassembly shown in FIG. 9.

To ensure the flanged portions retain their dimensional integrity and continue to provide an airtight seal with gasket 115 when tri-clamp assembly 110 is fully assembled, reinforcing structures are inserted into and/or formed in flanges 118. Referring now to FIGS. 9-11, in one aspect of the disclosure, a substantially circular flange insert shown designated generally as 220 includes a substantially planar body 222 with an axially extended annular perimeter rim 226 formed on a perimeter edge of body 222. Body 222 has further portions defining an insert bore 224 dimensioned and configured to have a diameter equal to, or greater than, the diameter of a lumen 208 defined by a reinforced flanged tube shown designated generally as 200. If the diameter of bore 224 is larger than the diameter of lumen 208, insert 220 can be integrated into the flange by overmolding the polymer material used to make tube 202 and flange 204 onto and over the radially inwardly portions of body 222 defining bore 224.

With respect to the embodiment shown in FIGS. 9-11, flanged tube 200 has hollow cylindrical body 202 that substantially defines lumen 208. An end of tube body 202 is formed with a radially extending flange 204, radially inner portions of which also define lumen 208. A flange bottom surface 206 forms an annular slope wherein the thickest portion of the sloped surface is proximal to tube body 202 and the thinnest portion is toward the radially extended perimeter edge of flange 204. This slope orientation permits clamp assembly 130 to draw mated flanges together when clamp assembly 130 is compressed against flange 204.

Flange 204 has a substantially planar top annular surface 216 configured to register against a corresponding flange top surface of a second flange 204 as shown in FIG. 7. A top portion of flange 204 defines an annular, substantially planar gasket body support surface 214 that partially defines lumen 208. A segment of flange 204 between insert rim 226 and surface 214 defines an annular flange channel 210 configured and dimensioned to receive gasket shoulder 119. The transition from surface 214 to channel 210 may be defined as a radiused annular slope 212 that presents a smooth transition so as not to create any angular edges that could present a gasket penetrating surface. Likewise, the transition from rim 226 to channel 210 may also be defined as a radially distal annular radiused slope to provide support for gasket 115 in a manner that does create any angular edges that could penetrate or damage an installed tri-clamp gasket when compressed between mated and clamped flanged tubes. The radially outer annular edge of channel 210 may be defined by either a radially inner annular surface 228 of rim 226, or may be defined by polymer material overmolded onto insert body 222.

Insert 220 is secured illustratively to flange 204 by being placed in a mold used to form the flanged tube prior to the introduction of the polymer used to form the tube via injection molding or like production method. In one embodiment, insert 220 is positioned in the mold so that a top annular substantially planar surface 230 of rim 226 is exposed when the flanged tube is formed. In an alternative embodiment, insert 220 is placed in the mold so that the entire insert including surface 230 is overmolded and entirely engulfed by the flanged tube material. With either of these embodiments, the entire radially outer surface of rim 226 is buried in the polymer material so that the outer annular surface of flange 204 is defined by the polymer material. An annular flange registration surface 216 is formed with either embodiment and is either coplanar with surface 230 or axially proud of surface 230 so as to form the primary registration surface when a corresponding flanged tube is registered against flange 204.

Figure 29:
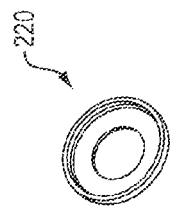
FIG. 29 is a top perspective view of the flange insert according to the embodiment shown in FIG. 27.
Figure 27:
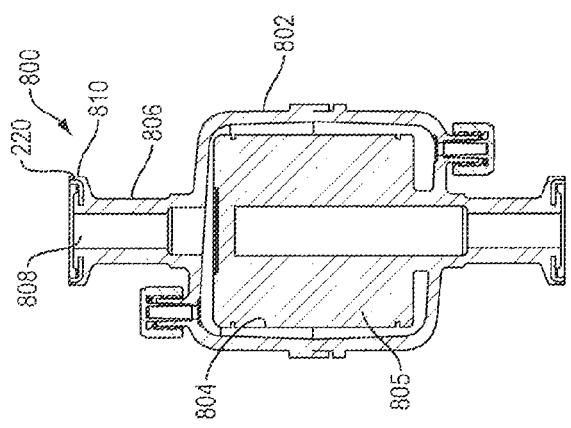
FIG. 27 is a side sectional view of a filter housing or capsule with a reinforced flanged port according to an embodiment of the disclosure.
Figure 28:
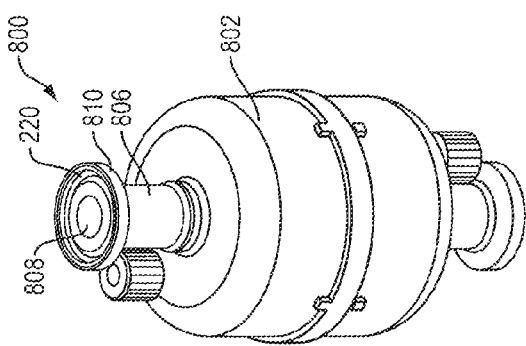
FIG. 28 is a top perspective view of the filter housing or capsule shown in FIG. 27.

It should be understood that insert 220 may also be incorporated into the flanged portion of a filter housing port or tri-clamp adapter such as shown in FIGS. 27-29 and provide the same reinforcing function provided to flange 204 of flanged tube 200. As shown in FIGS. 27-29, a filter housing or capsule shown designated generally as 800 includes a housing body 802 that defines a filter-holding chamber 804. A filter or filter medium 805 enclosed in chamber 804 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media, e.g. AC, ion exchange resins, or other functional resins for the purification of fluids well known in the art.

At least one port 806 extends from housing body 802 and defines a port lumen 808 in fluid communication with chamber 804. An end of port 806 distal from housing body 802 is formed with a radially extending flange 810. Insert 220 is secured in the port 806/flange 810 subassembly in the same spatial orientation and manner as shown and described with respect to securing insert 220 in flanged tube 200. The same materials and methods described for forming the combination of flanged tube 200 and insert 220 apply equally with respect to the formation of flanged port 806 and insert 220.

It should be further understood that insert 220 may be incorporated into any flanged pipe or standalone flanged fitting in the same manner as described for incorporating insert 220 into flanged tube 200. The same materials and methods described for forming the combination of flanged tube 200 and insert 220 apply equally with respect to the formation of a flanged pipe or standalone flanged fitting and insert 220.

Insert 220 also may be incorporated into a cartridge filter, or a disc capsule filter such as shown in FIGS. 45-47 and FIGS. 63-65, respectively, and provide the same reinforcing function provided to flange 204 of flanged tube 200. With respect to cartridge filters, referring now specifically to FIGS. 45-47, a filter cartridge/tri-clamp adaptor assembly shown designated generally as 1400 includes a filter cartridge body 1402 having a tri-clamp flange adapter 1406 formed on, or secured to, an end of cartridge filter body 1402. Adapter 1406 defines a lumen 1408 in fluid communication with a filter securing frame 1404 defined by body 1402. Securing frame 1404 is configured to receive and hold one or more filters or filter media (not shown, but disclosed herein with respect to other aspects of the disclosure) for use in a larger assembly.

An end of port 1406 distal from body 1402 is formed with a radially extending flange 1410. Insert 220 is secured in the adapter 1406/flange 1410 subassembly in the same spatial orientation and manner as shown and described with respect to securing insert 220 in flanged tube 200. The same materials and methods described for forming the combination of flanged tube 200 and insert 220 apply equally with respect to the formation of flanged port 1406 and insert 220.

Figure 65:
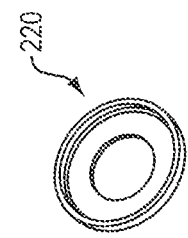
FIG. 65 is a top perspective view of the flange insert according to the embodiment shown in FIG. 63.
Figure 63:
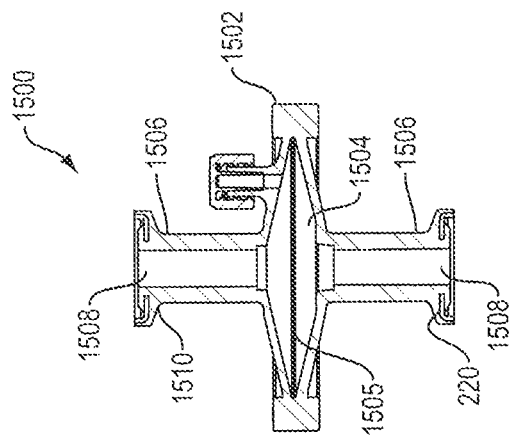
FIG. 63 is a side sectional view of a disc capsule filter with a reinforced flanged tri-clamp adapter according to another embodiment of the disclosure.
Figure 64:
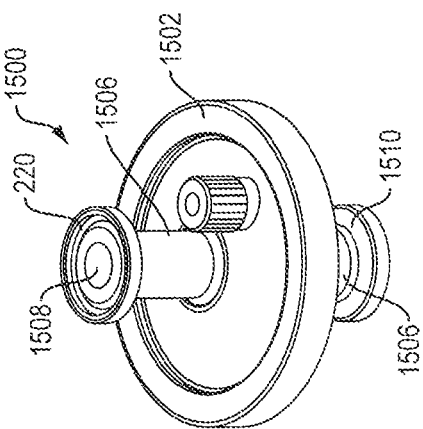
FIG. 64 is a top perspective view of the disc capsule filter shown in FIG. 63.

With respect to disc capsule filters, referring specifically to FIGS. 63-65, a disc capsule filter/flange assembly shown designated generally as 1500 includes a disc capsule body 1502 having a tri-clamp flange adapter 1506 formed on, or secured to, an end of capsule body 1502. Body 1502 defines a filter chamber 1504 that houses one or more disc filter(s) 1505 that may be constructed from single or multilayer membrane(s) and/or media discs.

Adapter 1506 defines a lumen 1508 in fluid communication with the internal chamber of body 1502. An end of adapter 1506 distal from body 1502 is formed with a radially extending flange 1510. Insert 220 is secured in the adapter 1506/flange 1510 subassembly in the same spatial orientation and manner as shown and described with respect to securing insert 220 in flanged tube 200. The same materials and methods described for forming the combination of flanged tube 200 and insert 220 apply equally with respect to the formation of flanged port 1506 and insert 220.

Figure 14:
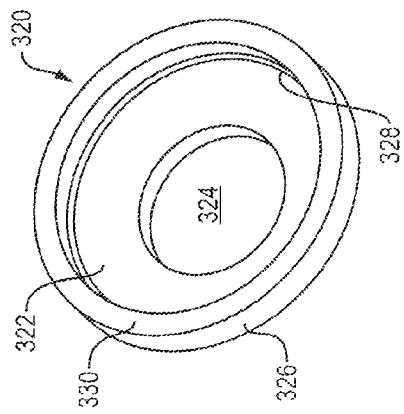
FIG. 14 is a top perspective view of a flange insert according to the embodiment of the disclosure shown in FIG. 12.
Figure 12:
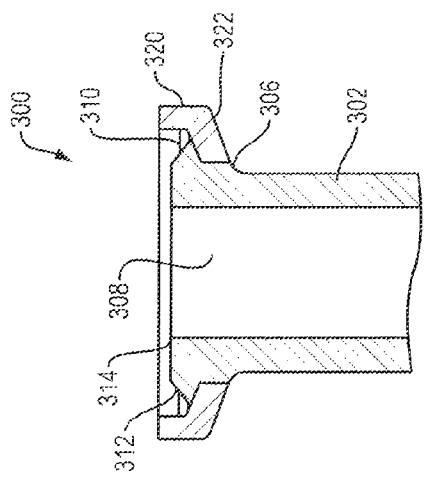
FIG. 12 is a side sectional view of a tube/flange/insert subassembly according to another embodiment of the disclosure.
Figure 13:
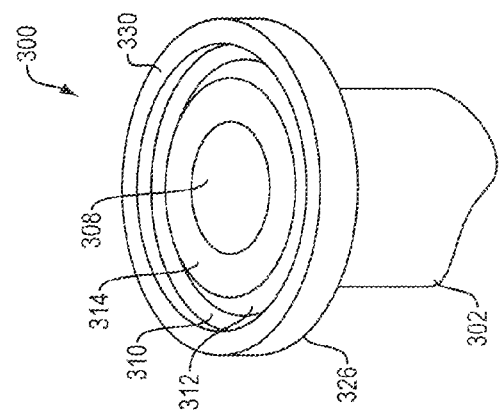
FIG. 13 is a top perspective view of the tube/flange/insert subassembly shown in FIG. 12.

Referring now to FIGS. 12-14, in another aspect of the disclosure, a reinforcement insert shown designated generally as 320 is used to reinforce and form the flanged portion of a flanged tube shown designated generally as 300. Tube 300 includes a hollow cylindrical body 302 with a partial radially extending sloped flange 306 formed on an end of the tube body. Tube body 302 defines a tube lumen 308. In this embodiment, the remainder of the flange is derived substantially from flange insert 320.

Insert 320 includes a frustoconically shaped main body 322 that may also be formed in a substantially planar configuration. An inner portion of main body 322 defines an insert bore 324 dimensioned and configured to have a diameter larger than the diameter of lumen 308. A raised annular shoulder 326 is formed about a perimeter edge of insert 320. A top annular surface 330 of shoulder 326 is substantially planar and provides a registration surface to which the flanged portion of another tube is registered against.

The frustoconical shape of main body 322 provides a surface against which polymer material used to form tube 300 can be overmolded whereby the area overmolded radially inwardly of shoulder 326 is thickest. This permits the formation of a structurally sound annular gasket body support surface 314 structured and configured to provide a registration and sealing surface for gasket 115. This also ensures the travel path for any fluids and/or gases flowed through the tube will not contact the material of insert 320. The frustoconical shape also permits the formation of an annular channel 310 radially extended from surface 314 dimensioned and configured to receive annular shoulder 119 of gasket 115.

The transition from surface 314 to channel 310 may be defined as a radiused annular slope 312 that presents a smooth transition so as not to create any angular edges that could present a gasket penetrating surface. Likewise, the transition from rim 326 and channel 310 may also be defined as a radially distal annular radiused slope to provide support for gasket 115 in a manner that does not place point loads on any surface of the gasket when compressed between mated and clamped flanged tubes. The radially outer annular edge of channel 310 may be defined by either a radially inner annular surface 328 of rim 326, or may be defined by polymer material overmolded on surface 328. As shown in the illustrative example, the radially outer annular edge of channel 310 is defined by surface 328 of this illustrative embodiment.

To join insert 320 to flanged tube 300, the same basic procedure used for insert 220 may be used. Insert 320 is positioned in a tube mold prior to the introduction of the polymer material used to form the tube. In similar fashion to insert 220, the polymer material flows over the portions of insert 320 defining insert bore 324 so as to be superposed about, and in registration with, those portions along with top and bottom surfaces of body 322. In this embodiment, however, the insert will form the outer annular edge of the tube's flange. This ensures maximum structural integrity to the flanged tube when compressed in a tri-clamp assembly and subjected to high-heat procedures such as sterilization. Alternative methods include ultrasonic welding and adhesives having high-heat resistance capabilities. Another alternative method to secure insert 320, is to press-fit onto the pre-formed tube with the partial flange. A yet further alternative is to secure the insert to the tube when the tube material is only partially cured.

Figure 32:
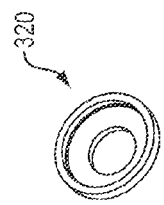
FIG. 32 is a top perspective view of the flange insert according to the embodiment shown in FIG. 30.
Figure 30:
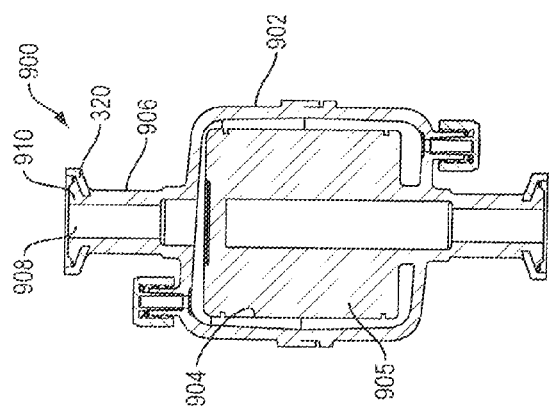
FIG. 30 is a side sectional view of a filter housing or capsule with a reinforced flanged port according to another embodiment of the disclosure.
Figure 31:
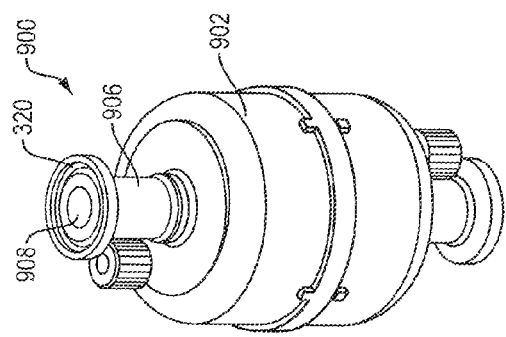
FIG. 31 is a top perspective view of the filter housing or capsule shown in FIG. 30.

It should be understood that insert 320 may also be incorporated into the flanged portion of a filter housing port such as shown in FIGS. 30-32 and provide the same reinforcing function provided to flange 304 of flanged tube 300. As shown in FIGS. 30-32, a filter housing or capsule shown designated generally as 900 includes a housing body 902 that defines a filter-holding chamber 904. A filter or filter medium 905 enclosed in chamber 904 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media, e.g. AC, ion exchange resins, or other functional resins for the purification of fluids well known in the art.

At least one port 906 extends from housing body 902 and defines a port lumen 908 in fluid communication with chamber 904. An end of port 906 distal from housing body 902 is formed with a radially extending flange 910. Insert 320 is secured in the port 906/flange 910 subassembly in the same spatial orientation and manner as shown and described with respect to securing insert 320 in flanged tube 300. The same materials and methods described for forming the combination of flanged tube 300 and insert 320 apply equally with respect to the formation of flanged port 906 and insert 320.

It should be further understood that insert 320 may be incorporated into any flanged pipe or standalone flanged fitting in the same manner as described for incorporating insert 320 into flanged tube 300. The same materials and methods described for forming the combination of flanged tube 300 and insert 320 apply equally with respect to the formation of a flanged pipe or standalone flanged fitting and insert 320.

Insert 320 also may be incorporated into a cartridge filter, or a disc capsule filter such as shown in FIGS. 48-50 and 66-68, respectively, and provide the same reinforcing function provided to flange 304 of flanged tube 300. With respect to cartridge filters, referring now specifically to FIGS. 48-50, a filter cartridge/tri-clamp adaptor assembly shown designated generally as 1600 includes a filter cartridge body 1602 having a tri-clamp flange adapter 1606 formed on, or secured to, an end of cartridge filter body 1602. Adapter 1606 defines a lumen 1608 in fluid communication with a filter securing frame 1604 defined by body 1602 for incorporation into a larger assembly. Securing frame 1604 is configured to receive and hold one or more filters (not shown, but disclosed herein with respect to other aspects of the disclosure) for incorporation into a large assembly.

An end of port 1606 distal from body 1602 is formed with a radially extending flange 1610. Insert 320 is secured in the adapter 1606/flange 1610 subassembly in the same spatial orientation and manner as shown and described with respect to securing insert 320 in flanged tube 300. The same materials and methods described for forming the combination of flanged tube 300 and insert 320 apply equally with respect to the formation of flanged port 1606 and insert 320.

Figure 68:
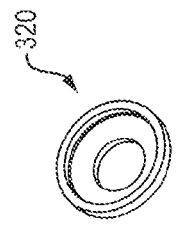
FIG. 68 is a top perspective view of the flange insert according to the embodiment shown in FIG. 66.
Figure 66:
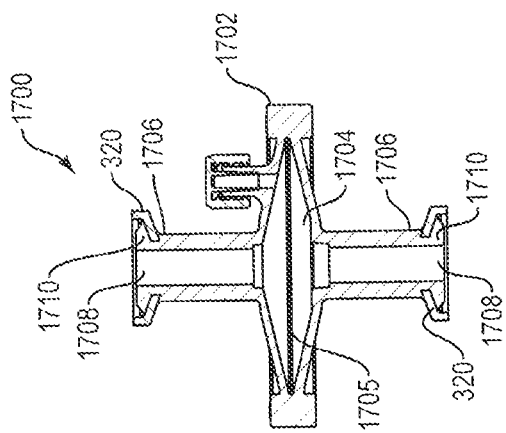
FIG. 66 is a side sectional view of a disc capsule filter with a reinforced flanged tri-clamp adapter according to a further embodiment of the disclosure.
Figure 67:
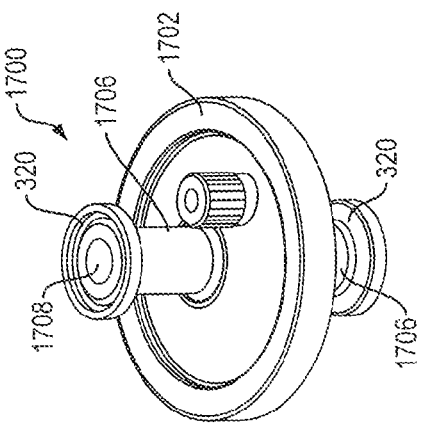
FIG. 67 is a top perspective view of the disc capsule filter shown in FIG. 66.

With respect to disc capsule filters, referring specifically to FIGS. 66-68, a disc capsule filter/flange assembly shown designated generally as 1700 includes a disc capsule body 1702 having a tri-clamp flange adapter 1706 formed on, or secured to, an end of capsule body 1702. Body 1702 defines a filter chamber 1704 that houses one or more disc filter(s) 1705 that may be constructed from single or multilayer membrane(s) and/or media discs. Adapter 1706 defines a lumen 1708 in fluid communication with the internal chamber of body 1702. An end of adapter 1706 distal from body 1702 is formed with a radially extending flange 1710. Insert 320 is secured in the adapter 1706/flange 1710 subassembly in the same spatial orientation and manner as shown and described with respect to securing insert 320 in flanged tube 300. The same materials and methods described for forming the combination of flanged tube 300 and insert 320 apply equally with respect to the formation of flanged port 1706 and insert 320.

Figure 17:
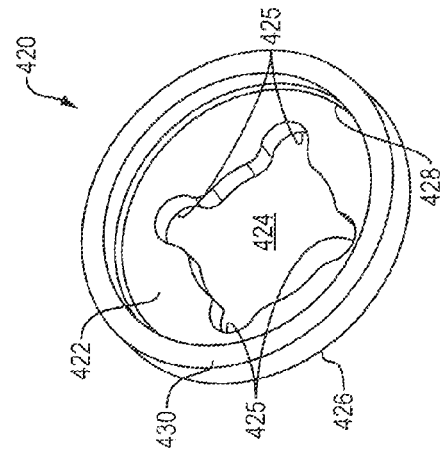
FIG. 17 is a top perspective view of a flange insert according to the embodiment shown in FIG. 15.
Figure 15:
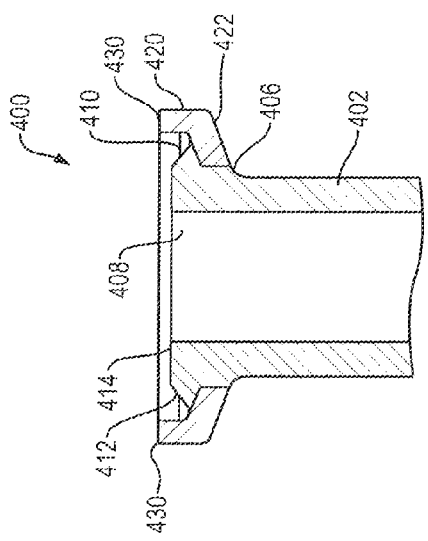
FIG. 15 is a side sectional view of a tube/flange/insert subassembly according to a further embodiment of the disclosure.
Figure 16:
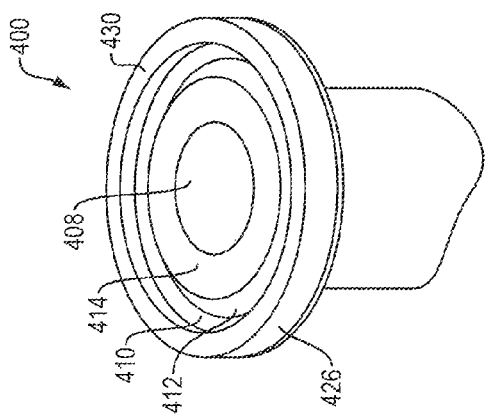
FIG. 16 is a top perspective view of the tube/flange/insert subassembly according to the embodiment shown in FIG. 15.

Referring now to FIGS. 15-17, in a further aspect of the disclosure, a flange insert shown designated generally as 420 is secured to a flanged tube shown designated generally as 400 so as to improve the structural integrity of the flanged tube. Tube 400 includes a substantially hollow cylindrical body 402 that defines a lumen 408 and has a partially radially extending sloped flange 406 formed on an end of the tube body. In similar fashion to the embodiment shown in FIGS. 12-14, insert 420 provides and defines the radially outward annular edge of the tube's flange.

Insert 420 includes a frustoconically shaped main body 422 that may also be formed in a substantially planar configuration. An inner portion of main body 422 defines an insert bore 424 dimensioned and configured to have a diameter larger than the diameter of lumen 408. A raised annular shoulder 426 is formed about a perimeter edge of insert 420. A top annular surface 430 of shoulder 426 is substantially planar and provides a registration surface to which the flanged portion of another tube is registered against.

The frustoconical shape of main body 422 provides a surface against which polymer material used to form tube 400 can be overmolded whereby the area overmolded radially inwardly of rim 426 is thickest. With this construction, the polymer material flows below, above, superposed about, and in registration with, the portions of body 422 that define central bore 424. This permits the formation of a structurally sound, annular gasket body support surface 414 structured and configured to provide a registration and sealing surface for gasket 115. The frustoconical shape also permits the formation of an annular channel 410 radially extended from surface 414 dimensioned and configured to receive annular shoulder 119 of gasket 115.

The transition from surface 414 to channel 410 may be defined as a radiused annular slope 412 that presents a smooth transition so as not to create any angular edges that could present a gasket penetrating surface. Likewise, the transition from rim 426 and channel 410 may also be defined as a radially distal annular radiused slope to provide support for gasket 115 in a manner that does not place point loads via angular surfaces on any surface of the gasket when compressed between mated and clamped flanged tubes. The radially outer annular edge of channel 410 may be defined by either a radially inner annular surface 428 of rim 426, or may be defined by polymer material overmolded on surface 428. As shown in the illustrative example, the radially outer annular edge of channel 410 is defined by surface 428 of this illustrative embodiment.

To improve the mechanical bond between insert 420 and tube 402, bore 424 is structured as a modified bore with the generally continuous, incrementally smooth circular bore modified by one or more eccentric cutouts 425 configured to provide a non-continuous profile. Because the insert and polymer material do not chemically bond, the bond between the two components has to be achieved via mechanical means. By creating a non-continuous bore profile, when the polymer material flows over the inner diameter of the insert, when cured, the insert is locked into place and cannot rotate or move axially within the overmolded segment of the flanged tube.

To join insert 420 to flanged tube 400, the same basic procedures used for inserts 220 and 320 may be used. Insert 420 is positioned in a tube mold prior to the introduction of the polymer material used to form the tube. In this embodiment, like insert 320, the insert will form the outer annular edge of the tube's flange. This ensures maximum structural integrity to the flanged tube when compressed in a tri-clamp assembly and subjected to high-heat procedures such as sterilization. A yet further alternative is to secure the insert to the tube when the tube material is only partially cured.

Figure 35:
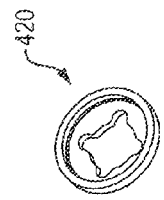
FIG. 35 is a top perspective view of the flange insert according to the embodiment shown in FIG. 33.
Figure 33:
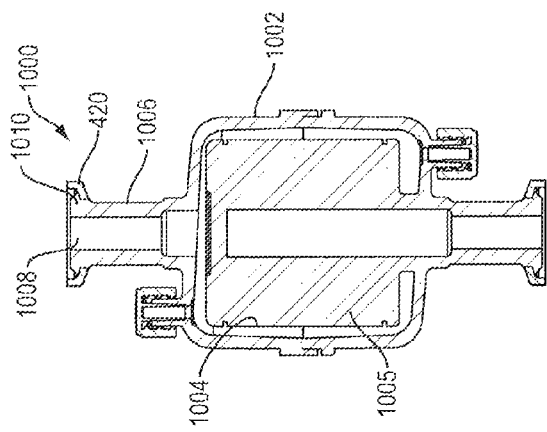
FIG. 33 is a side sectional view of a filter housing or capsule with a reinforced flanged port according to a further embodiment of the disclosure.
Figure 34:
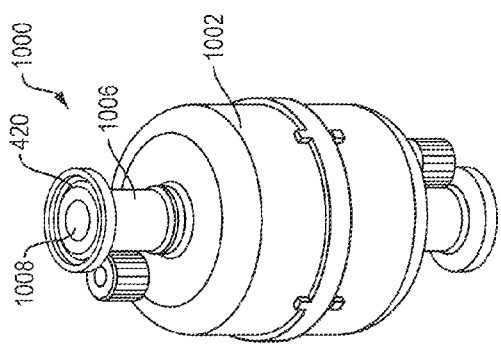
FIG. 34 is a top perspective view of the filter housing or capsule shown in FIG. 33.

It should be understood that insert 420 may also be incorporated into the flanged portion of a filter housing port such as shown in FIGS. 33-35 and provide the same reinforcing function provided to flange 404 of flanged tube 400. As shown in FIGS. 33-35, a filter housing or capsule shown designated generally as 1000 includes a housing body 1002 that defines a filter-holding chamber 1004. A filter or filter medium 1005 enclosed in chamber 1004 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media, e.g. AC, ion exchange resins, or other functional resins for the purification of fluids well known in the art. At least one port 1006 extends from housing body 1002 and defines a port lumen 1008 in fluid communication with chamber 1004.

An end of port 1006 distal from housing body 1002 is formed with a radially extending flange 1010. Insert 420 is secured in the port 1006/flange 1010 subassembly in the same spatial orientation and manner as shown and described with respect to securing insert 420 in flanged tube 400. The same materials and methods described for forming the combination of flanged tube 400 and insert 420 apply equally with respect to the formation of flanged port 1006 and insert 420.

It should be further understood that insert 420 may be incorporated into any flanged pipe or standalone flanged fitting in the same manner as described for incorporating insert 420 into flanged tube 400. The same materials and methods described for forming the combination of flanged tube 400 and insert 420 apply equally with respect to the formation of a flanged pipe or standalone flanged fitting and insert 420.

Insert 420 also may be incorporated into a cartridge filter, or a disc capsule filter such as shown in FIGS. 51-53 and 69-71, respectively, and provide the same reinforcing function provided to flange 404 of flanged tube 400. With respect to cartridge filters, referring now specifically to FIGS. 51-53, a filter cartridge/tri-clamp adaptor assembly shown designated generally as 1800 includes a filter cartridge body 1802 having a tri-clamp flange adapter 1806 formed on, or secured to, an end of cartridge filter body 1802. Adapter 1806 defines a lumen 1808 in fluid communication with a filter securing frame 1804 defined by body 1802. Securing frame 1804 is configured to receive and hold one or more filters (not shown, but disclosed herein with respect to other aspects of the disclosure) for incorporation into a larger assembly.

An end of port 1806 distal from body 1802 is formed with a radially extending flange 1810. Insert 420 is secured in the adapter 1806/flange 1810 subassembly in the same spatial orientation and manner as shown and described with respect to securing insert 420 in flanged tube 400. The same materials and methods described for forming the combination of flanged tube 400 and insert 420 apply equally with respect to the formation of flanged port 1806 and insert 420.

Figure 71:
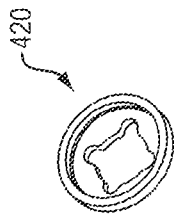
FIG. 71 is a top perspective view of the flange insert according to the embodiment shown in FIG. 69
Figure 69:
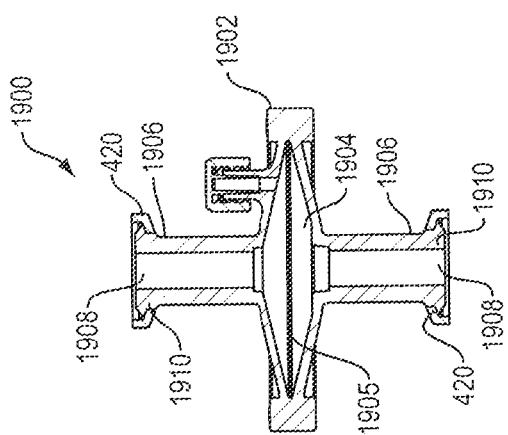
FIG. 69 is a side sectional view of a disc capsule filter with a reinforced flanged tri-clamp adapter according to yet another embodiment of the disclosure.
Figure 70:
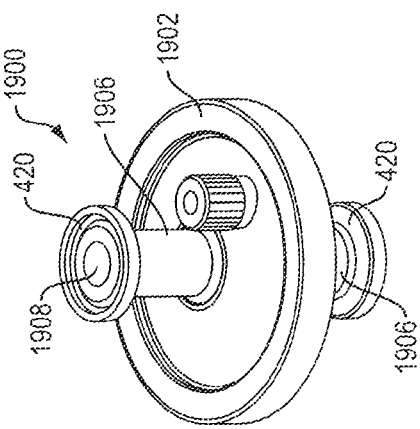
FIG. 70 is a top perspective view of the disc capsule filter shown in FIG. 69.

With respect to disc capsule filters, referring specifically to FIGS. 69-71, a disc capsule filter/flange assembly shown designated generally as 1900 includes a disc capsule body 1902 having a tri-clamp flange adapter 1906 formed on, or secured to, an end of capsule body 1902. Body 1902 defines a filter chamber 1904 that houses one or more disc filter(s) 1905 that may be constructed from single or multilayer membrane(s) and/or media discs. Adapter 1906 defines a lumen 1908 in fluid communication with the internal chamber of body 1902. An end of adapter 1906 distal from body 1902 is formed with a radially extending flange 1910. Insert 420 is secured in the adapter 1906/flange 1910 subassembly in the same spatial orientation and manner as shown and described with respect to securing insert 420 in flanged tube 400. The same materials and methods described for forming the combination of flanged tube 400 and insert 420 apply equally with respect to the formation of flanged port 1906 and insert 420.

Figure 20:
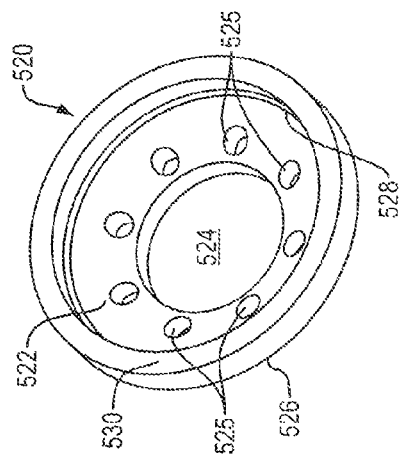
FIG. 20 is a top perspective view of the flange insert according to the embodiment shown in FIG. 18.
Figure 18:
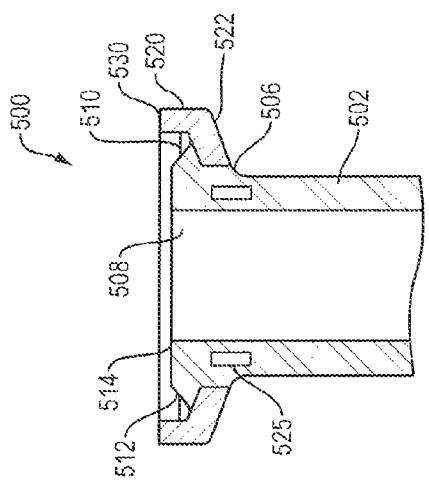
FIG. 18 is a side sectional view of a tube/flange/insert subassembly according to yet another embodiment of the disclosure.
Figure 19:
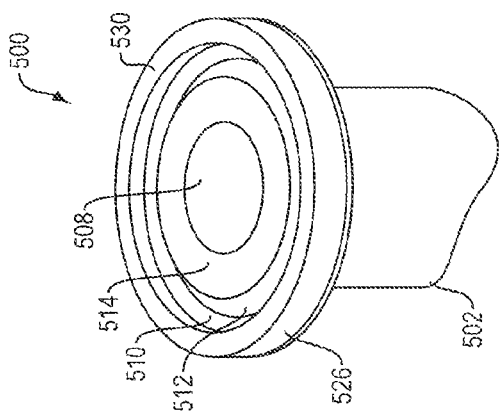
FIG. 19 is a top perspective view of the tube/flange/insert subassembly according to the embodiment shown in FIG. 18.

Referring now to FIGS. 18-20, in a still further aspect of the disclosure, a flange insert shown designated generally as 520 is secured to a flanged tube shown designated generally as 500 so as to improve the structural integrity of the flanged tube. Tube 500 includes a substantially hollow cylindrical body 502 that defines a lumen 508 and has a partially radially extending sloped flange 506 formed on an end of the tube body. In similar fashion to the embodiments shown in FIGS. 12-17, insert 520 provides and defines the radially outward annular edge of the tube's flange.

Insert 520 includes a frustoconically shaped main body 522 that may also be formed in a substantially planar configuration. An inner portion of main body 522 defines an insert bore 524 dimensioned and configured to have a diameter larger than the diameter of lumen 508. A raised annular shoulder 526 is formed about a perimeter edge of insert 520. A top annular surface 530 of shoulder 526 is substantially planar and provides a registration surface to which the flanged portion of another tube is registered against.

The frustoconical shape of main body 522 provides a surface against which polymer material used to form tube 500 can be overmolded whereby the area overmolded radially inwardly of rim 526 is thickest. With this construction, the polymer material flows below, above, superposed about and in registration with, the portions of body 522 that define central bore 524. This permits the formation of a structurally sound annular gasket body support surface 514 structured and configured to provide a registration and sealing surface for gasket 115. The frustoconical shape also permits the formation of an annular channel 510 radially extended from surface 514 dimensioned and configured to receive annular shoulder 119 of gasket 115.

The transition from surface 514 to channel 510 may be defined as a radiused annular slope 512 that presents a smooth transition so as not to create any angular edges that could present a gasket penetrating surface. Likewise, the transition from rim 526 and channel 510 may also be defined as a radially distal annular radiused slope to provide support for gasket 115 in a manner that does not place point loads on any surface of the gasket when compressed between mated and clamped flanged tubes. The radially outer annular edge of channel 510 may be defined by either a radially inner annular surface 528 of rim 526, or may be defined by polymer material overmolded on surface 528. As shown in the illustrative example, the radially outer annular edge of channel 510 is defined by surface 528 of this illustrative embodiment.

To improve the mechanical bond between insert 520 and tube 502, one or more secondary bores 525 are formed in insert body 522 between bore 524 and rim 526. Secondary bore(s) 525 provide the same basic function as cutouts 425 in the embodiment shown in FIGS. 15-17 to mechanically lock the insert in the flanged portion of flanged tube 500. By creating one or more discrete bores 525 in insert body 522, the polymer material used to form tube assembly 500 flows over the inner diameter of the insert and into and through bore(s) 525. When cured, the polymer material that resides in bore(s) 525 combines with the polymer material that flowed over and under the portions of insert body 522 that define bore 524 to lock the insert in place so that it cannot rotate or move axially within the overmolded segment of the flanged tube.

To join insert 520 to flanged tube 500, the same basic procedures used for inserts 320 and 420 may be used. Insert 520 is positioned in a tube mold prior to the introduction of the polymer material used to form the tube. In this embodiment, like inserts 320 and 420, the insert will form the outer annular edge of the tube's flange. This ensures maximum structural integrity to the flanged tube when compressed in a tri-clamp assembly and subjected to high-heat procedures such as sterilization. In an alternative method to secure insert 520, the insert may be secured to the tube when the tube material is only partially cured.

Figure 38:
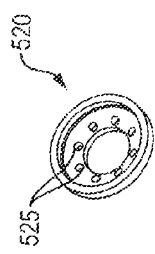
FIG. 38 is a top perspective view of the flange insert according to the embodiment shown in FIG. 36.
Figure 36:
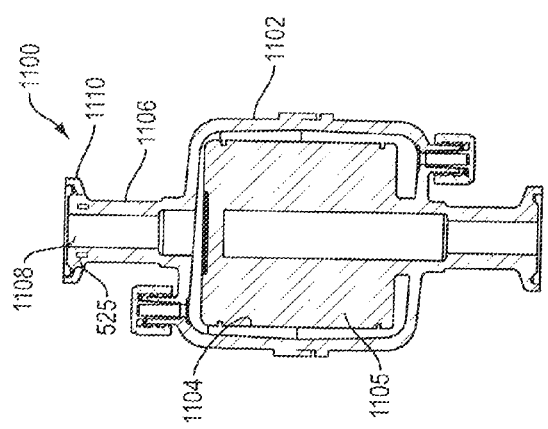
FIG. 36 is a side sectional view of a filter housing or capsule with a reinforced t0 flanged port according to yet another embodiment of the disclosure.
Figure 37:
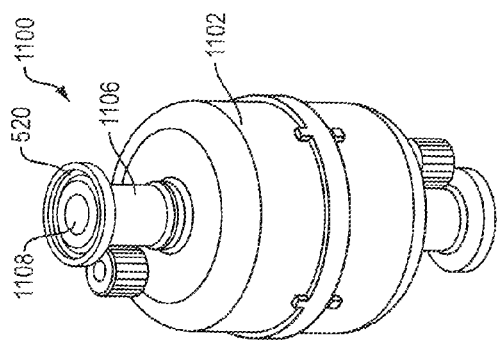
FIG. 37 is a top perspective view of the filter housing or capsule shown in FIG. 36.

It should be understood that insert 520 may also be incorporated into the flanged portion of a filter housing port such as shown in FIGS. 36-38 and provide the same reinforcing function provided to flange 504 of flanged tube 500. As shown in FIGS. 33 and 34, a filter housing or capsule shown designated generally as 1100 includes a housing body 1102 that defines a filter-holding chamber 1104. A filter or filter medium 1105 enclosed in chamber 1104 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media, e.g. AC, ion exchange resins, or other functional resins for the purification of fluids well known in the art.

At least one port 1106 extends from housing body 1102 and defines a port lumen 1108 in fluid communication with chamber 1104. An end of port 1106 distal from housing body 1102 is formed with a radially extending flange 1110. Insert 520 is secured in the port 1106/flange 1110 subassembly in the same spatial orientation and manner as shown and described with respect to securing insert 520 in flanged tube 500. The same materials and methods described for forming the combination of flanged tube 500 and insert 520 apply equally with respect to the formation of flanged port 1106 and insert 520.

It should be further understood that insert 520 may be incorporated into any flanged pipe or standalone flanged fitting in the same manner as described for incorporating insert 520 into flanged tube 500. The same materials and methods described for forming the combination of flanged tube 500 and insert 520 apply equally with respect to the formation of a flanged pipe or standalone flanged fitting and insert 520.

Insert 520 also may be incorporated into a cartridge filter, or a disc capsule filter such as shown in FIGS. 54-56 and 72-74, respectively, and provide the same reinforcing function provided to flange 504 of flanged tube 500. With respect to cartridge filters, referring now specifically to FIGS. 54-56, a filter cartridge/tri-clamp adaptor assembly shown designated generally as 2000 includes a filter cartridge body 2002 having a tri-clamp flange adapter 2006 formed on, or secured to, an end of cartridge filter body 2002. Adapter 2006 defines a lumen 2008 in fluid communication with a filter securing frame 2004 defined by body 2002. Securing frame 2004 is configured to receive and hold one or more filters (not shown, but disclosed herein with respect to other aspects of the disclosure) for incorporation into a larger assembly.

An end of port 2006 distal from body 2002 is formed with a radially extending flange 2010. Insert 520 is secured in the adapter 2006/flange 2010 subassembly in the same spatial orientation and manner as shown and described with respect to securing insert 520 in flanged tube 500. The same materials and methods described for forming the combination of flanged tube 500 and insert 520 apply equally with respect to the formation of flanged port 2006 and insert 520.

With respect to disc capsule filters, referring specifically to FIGS. 72-74, a disc capsule filter/flange assembly shown designated generally as 2100 includes a disc capsule body 2102 having a tri-clamp flange adapter 2106 formed on, or secured to, an end of capsule body 2102. Body 2102 defines a filter chamber 2104 that houses one or more disc filter(s) 2105 that may be constructed from single or multilayer membrane(s) and/or media discs. Adapter 2106 defines a lumen 2108 in fluid communication with the internal chamber of body 2102. An end of adapter 2106 distal from body 2102 is formed with a radially extending flange 2110. Insert 520 is secured in the adapter 2106/flange 2110 subassembly in the same spatial orientation and manner as shown and described with respect to securing insert 520 in flanged tube 500. The same materials and methods described for forming the combination of flanged tube 500 and insert 520 apply equally with respect to the formation of flanged port 2106 and insert 520.

Figure 23:
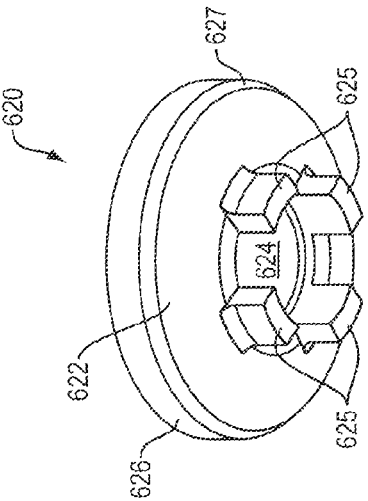
FIG. 23 is a bottom perspective view of the flange insert according to the embodiment shown in FIG. 21.
Figure 21:
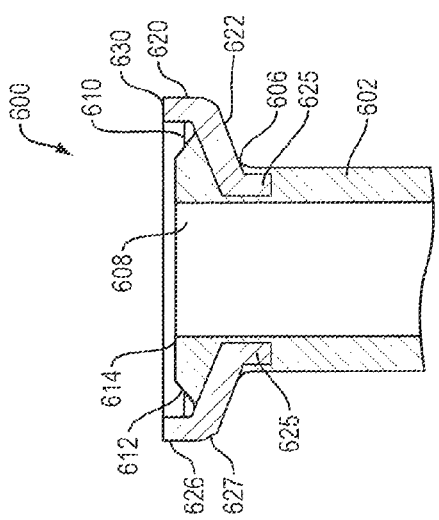
FIG. 21 is a side sectional view of a tube/flange/insert subassembly according to a yet further embodiment of the disclosure.
Figure 22:
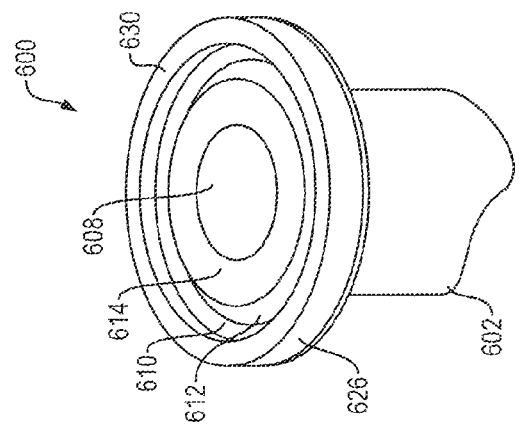
FIG. 22 is a top perspective view of the tube/flange/insert subassembly shown in FIG. 21.

Referring now to FIGS. 21-23, in yet another aspect of the disclosure, a flange insert shown designated generally as 620 is secured to a flanged tube shown designated generally as 600 so as to improve the structural integrity of the flanged tube. Tube 600 includes a substantially hollow cylindrical body 602 that defines a lumen 608 and has a partially radially extending sloped flame 606 formed on an end of the tube body. In similar fashion to the embodiment shown in FIGS. 12-14, insert 620 provides and defines the radially out and annular edge of the tube's flange.

Insert 620 includes a frustoconically shaped main body 622 that may also be formed in a substantially planar configuration. An inner portion of main body 622 defines an insert bore 624 dimensioned and configured to have a diameter larger than the diameter of lumen 608. A raised annular shoulder 626 is formed about a perimeter edge of insert 620. The exterior transition from main body 622 to shoulder 626 may take the form of an annular chamfer 627 to eliminate a relatively sharp annular edge. A top annular surface 630 of shoulder 626 is substantially planar and provides a registration surface to which the flanged portion of another tube is registered against.

The frustoconical shape of main body 622 provides a surface against which polymer material used to form tube 600 can be overmolded whereby the area overmolded radially inwardly of rim 626 is thickest. With this construction, the polymer material flows below, above, superposed about, and in registration with, the portions of body 622 that define central bore 624. This permits the formation of a structurally sound annular gasket body support surface 614 structured and configured to provide a registration and sealing surface for gasket 115. The frustoconical shape also permits the formation of an annular channel 610 radially extended from surface 614 dimensioned and configured to receive annular shoulder 119 of gasket 115.

The transition from surface 614 to channel 610 may be defined as a radiused annular slope 612 that presents a smooth transition so as not to create any angular edges that could present a gasket penetrating surface. Likewise, the transition from rim 626 and channel 610 may also be defined as a radially distal annular radiused slope to provide support for gasket 115 in a manner that does not place point loads on any surface of the gasket when compressed between mated and clamped flanged tubes. The radially outer annular edge of channel 610 may be defined by either a radially inner annular surface of rim 626, (not shown, but similar in structure to inner annular surfaces 428 and 528) or may be defined by polymer material overmolded on surface 628. As shown in the illustrative example, the radially outer annular edge of channel 610 is defined by surface 628 of this illustrative embodiment.

To improve the mechanical bond between insert 620 and tube 602, one or more posts 625 are formed on a bottom surface of insert body 622 between bore 624 and rim 626 extending axially from insert body 622. Post(s) 625 may be formed in any regular or irregular shape in cross-section. Post(s) 625 are configured to provide an anchoring function to prevent rotation of insert 620 within the overmolded portions of the polymer material used to form tube assembly 600. This is done again because the insert and polymer material do not chemically bond, but are bonded via mechanical means. By including anchoring posts in the insert, when the polymer material flows over the inner diameter of the insert and over post(s) 625, when cured, the insert is locked into place and cannot rotate or move axially within the overmolded segment of the flanged tube.

To join insert 620 to flanged tube 600, the same basic procedures used for inserts 420 and 520 may be used. Insert 620 is positioned in a tube mold prior to the introduction of the polymer material used to form the tube. In this embodiment, like insert 520, the insert will form the outer annular edge of the tube's flange. This ensures maximum structural integrity to the flanged tube when compressed in a tri-clamp assembly and subjected to high-heat procedures such as sterilization. In an alternative method to secure insert 620, the insert may be press-fit onto the pre-formed tube with the partial flange. A yet further alternative is to secure the insert to the tube when the tube material is only partially cured.

Figure 41:
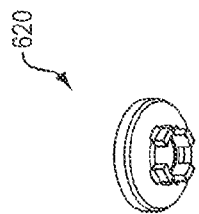
FIG. 41 is a top perspective view of the flange insert according to the embodiment shown in FIG. 39.
Figure 39:
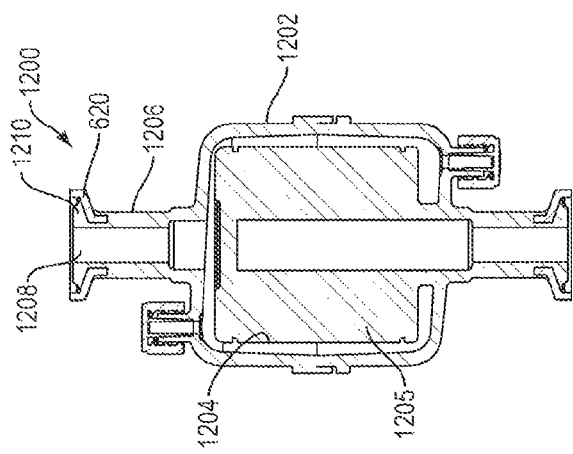
FIG. 39 is a side sectional view of a filter housing or capsule with a reinforced flanged port according to still another embodiment of the disclosure.
Figure 40:
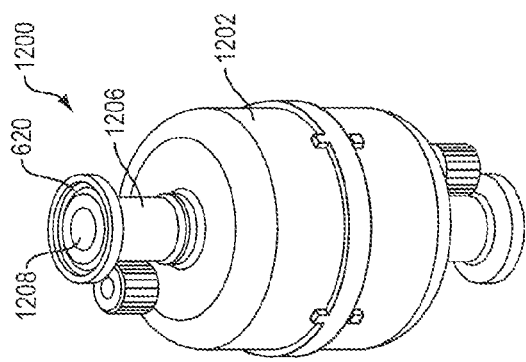
FIG. 40 is a top perspective view of the filter housing or capsule shown in FIG. 39.

It should be understood that insert 620 may also be incorporated into the flanged portion of a filter housing port such as shown in FIGS. 39-41 and provide the same reinforcing function provided to flange 604 of flanged tube 600. As shown in FIGS. 39-41, a filter housing or capsule shown designated generally as 1200 includes a housing body 1202 that defines a filter-holding chamber 1204. A filter or filter medium 1205 enclosed in chamber 1204 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media, e.g. AC, ion exchange resins, or other functional resins for the purification of fluids well known in the art.

At least one port 1206 extends from housing body 1202 and defines a port lumen 1208 in fluid communication with chamber 1204. An end of port 1206 distal from housing body 1202 is formed with a radially extending flange 1210. Insert 620 is secured in the port 1206/flange 1210 subassembly in the same spatial orientation and manner as shown and described with respect to securing insert 620 in flanged tube 600. The same materials and methods described for forming the combination of flanged tube 600 and insert 620 apply equally with respect to the formation of flanged port 1206 and insert 620.

It should be further understood that insert 620 may be incorporated into any flanged pipe or standalone flanged fitting in the same manner as described for incorporating insert 620 into flanged tube 600. The same materials and methods described for forming the combination of flanged tube 600 and insert 620 apply equally with respect to the formation of a flanged pipe or standalone flanged fitting and insert 620.

Insert 620 also may be incorporated into a cartridge filter, or a disc capsule filter such as shown in FIGS. 57-59 and 75-77, respectively, and provide the same reinforcing function provided to flange 604 of flanged tube 600. With respect to cartridge filters, referring now specifically to FIGS. 57-59, a filter cartridge/tri-clamp adaptor assembly shown designated generally as 2200 includes a filter cartridge body 2202 having a tri-clamp flange adapter 2206 formed on, or secured to, an end of cartridge filter body 2202. Adapter 2206 defines a lumen 2208 in fluid communication with a filter securing frame 2204 defined by body 2202. Securing frame 2204 is configured to receive and hold one or more filters (not shown, but disclosed herein with respect to other aspects of the disclosure) for incorporation into a larger assembly.

An end of port 2206 distal from body 2202 is formed with a radially extending flange 2210. Insert 620 is secured in the adapter 2206/flange 2210 subassembly in the same spatial orientation and manner as shown and described with respect to securing insert 620 in flanged tube 600. The same materials and methods described for forming the combination of flanged tube 600 and insert 620 apply equally with respect to the formation of flanged port 2206 and insert 620.

Figure 77:
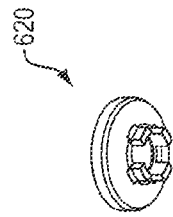
FIG. 77 is a top perspective view of the flange insert according to the embodiment shown in FIG. 75.
Figure 75:
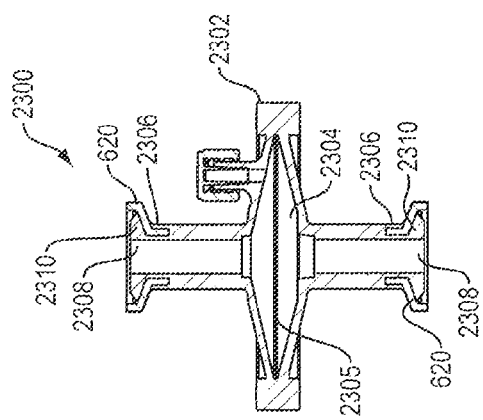
FIG. 75 is a side sectional view of a disc capsule filter with a reinforced flanged tri-clamp adapter according to still another embodiment of the disclosure.
Figure 76:
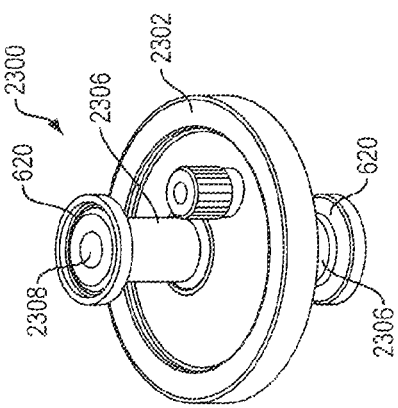
FIG. 76 is a top perspective view of the disc capsule filter shown in FIG. 75.

With respect to disc capsule filters, referring specifically to FIGS. 75-77, a disc capsule filter/flange assembly shown designated generally as 2300 includes a disc capsule body 2302 having a tri-clamp flange adapter 2306 formed on, or secured to, an end of capsule body 2302. Body 2302 defines a filter chamber 2304 that houses one or more disc filter(s) 2305 that may be constructed from single or multilayer membrane(s) and/or media discs. Adapter 2306 defines a lumen 2308 in fluid communication with the internal chamber of body 2302. An end of adapter 2306 distal from body 2302 is formed with a radially extending flange 2310. Insert 620 is secured in the adapter 2306/flange 2310 subassembly in the same spatial orientation and manner as shown and described with respect to securing insert 620 in flanged tube 600. The same materials and methods described for forming the combination of flanged tube 600 and insert 620 apply equally with respect to the formation of flanged port 2306 and insert 620.

Referring now to FIGS. 24-26, in still another aspect of the disclosure, a flange insert shown designated generally as 720 is secured to a flanged tube shown designated generally as 700 so as to improve the structural integrity of the flanged tube. Tube 700 includes a substantially hollow cylindrical body 702 that defines a lumen 708 and has a partially radially extending sloped flange 706 formed on an end of the tube body. In similar fashion to the embodiment shown in FIGS. 12-14, insert 720 provides and defines the radially outward annular edge of the tube's flange.

Insert 720 includes a frustoconically shaped main body 722 that may also be formed in a substantially planar configuration. Aid inner portion of main body 722 defines an insert bore 724 dimensioned and configured to have a diameter larger than the diameter of lumen 708. A raised annular shoulder 726 is formed about a perimeter edge of insert 720. The exterior transition from main body 722 to shoulder 726 may take the form of an annular chamfer 727 to eliminate a relatively sharp annular edge. A top annular surface 730 of shoulder 726 is substantially planar and provides a registration surface to which the flanged portion of another tube is registered against.

The frustoconical shape of main body 722 provides a surface against which polymer material used to form tube 700 can be overmolded whereby the area overmolded radially inwardly of rim 726 is thickest. With this construction, the polymer material flows below, above and superposed about the portions of body 722 that define central bore 724. This permits the formation of a structurally sound annular gasket body support surface 714 structured and configured to provide a registration and sealing surface for gasket 115. The frustoconical shape also permits the formation of an annular channel 710 radially extended from surface 614 dimensioned and configured to receive annular shoulder 119 of gasket 115.

The transition from surface 714 to channel 710 may be defined as a radiused annular slope 712 that presents a smooth transition so as not to create any angular edges that could present a gasket penetrating surface. Likewise, the transition from rim 726 and channel 710 may also be defined as a radially distal annular radiused slope to provide support for gasket 115 in a manner that does not place point loads on any surface of the gasket when compressed between mated and clamped flanged tubes. The radially outer annular edge of channel 710 may be defined by either a radially inner annular surface 728 of rim 726, or may be defined by polymer material overmolded on surface 728. As shown in the illustrative example, the radially outer annular edge of channel 710 is defined by surface 728 of this illustrative embodiment.

To improve the mechanical bond between insert 720 and tube 702, one or more ridges (or channels disclosed more fully below), or corrugated surfaces 725 are formed on a bottom surface of insert body 722 between bore 724 and rim 726 extending radially from core 724. Ridge(s) 725 are configured to provide a discontinuous surface so as to prevent rotation of insert 720 within the overmolded portions of the polymer material used to form tube assembly 700. This is done again because the insert and polymer material do not chemically bond, but are bonded via mechanical means. By including ridges on the bottom surface of the insert, when the polymer material flows over the inner diameter of the insert and over the raised ridge(s) 725 and corresponding intermittent valleys, when cured, the insert is locked into place and cannot rotate or move axially within the overmolded segment of the flanged tube. It should be understood that ridges (or channels disclosed below) could also be formed on the top surface, or on both the top and the bottom surfaces of insert body 722 and may be variably dimensioned to provide an enhanced discontinuous surface.

In an alternative embodiment, one or more radially extending channels can be formed on a bottom surface (or on a top surface or on both the bottom and the top surfaces) of insert body 722 between bore 724 and rim 726 in place of, or in addition to, ridge(s) 725. The channels may extend partially through the thickness of insert body 722, completely through the body, or have segments with extend partially through with other segments that extend completely though the thickness of insert body 722. The channel(s) in any of the disclosed configurations will provide a discontinuous surface similar to the discontinuous surface formed by ridges 725 so as to prevent rotation of insert 720 when the polymer material used to form the tube assembly 700 is overmolded onto insert 720 and cured. The channels may be formed in the molds used to form insert 720, or may be introduced into the insert with post-insert-formation machining.

To join insert 720 to flanged tube 700, the same basic procedures used for inserts 420 and 620 may be used. Insert 720 is positioned in a tube mold prior to the introduction of the polymer material used to form the tube. In this embodiment, like insert 620, the insert will form the outer annular edge of the tube's flange. This ensures maximum structural integrity to the flanged tube when compressed in a tri-clamp assembly and subjected to high-heat procedures such as sterilization. In an alternative method to secure insert 720, the insert may be press-fit onto the pre-formed tube with the partial flange. A yet further alternative is to secure the insert to the tube when the tube material is only partially cured.

Figure 44:
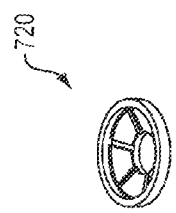
FIG. 44 is a top perspective view of the flange insert according to the embodiment shown in FIG. 42.
Figure 42:
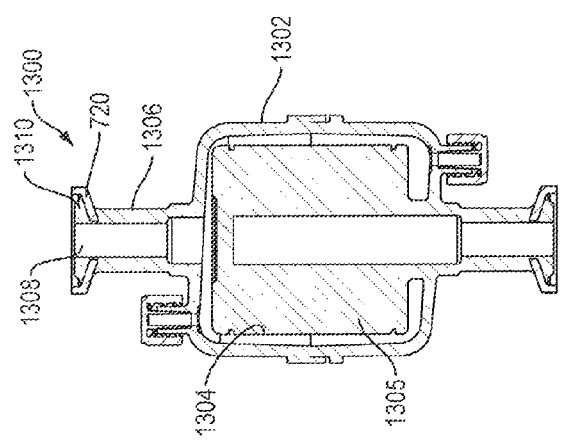
FIG. 42 is a side sectional view of a filter housing or capsule with a reinforced flanged port according to a yet further embodiment of the disclosure.
Figure 43:
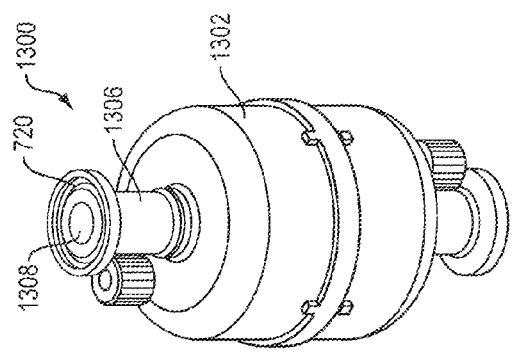
FIG. 43 is a top perspective view of the filter housing or capsule shown in FIG. 42.
Figure 47:
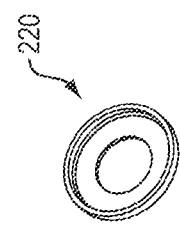
FIG. 47 is a top perspective view of the flange insert according to the embodiment shown in FIG. 45.
Figure 45:
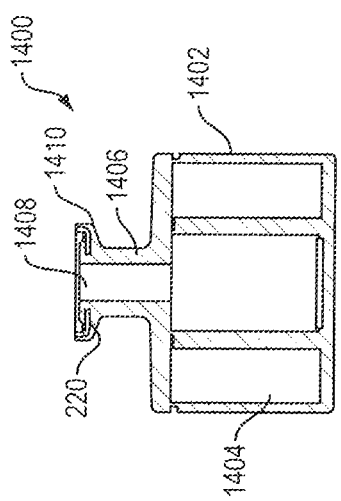
FIG. 45 is a side sectional view of a filter cartridge with a reinforced flanged tri-clamp adapter according to another embodiment of the disclosure.
Figure 46:
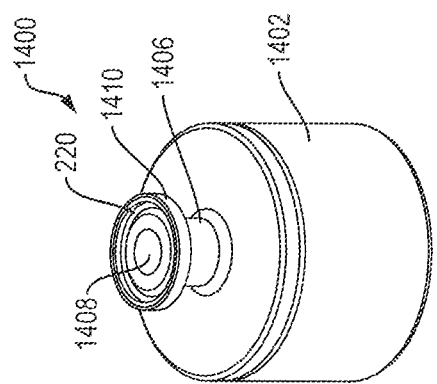
FIG. 46 is a top perspective view of the filter cartridge shown in FIG. 45.
Figure 48:
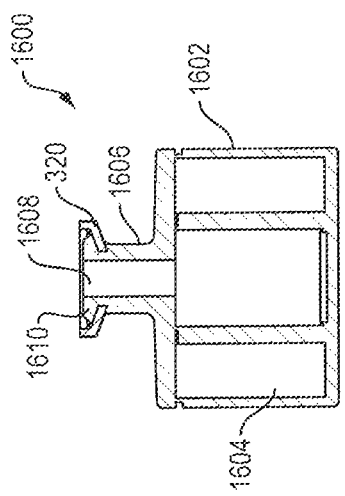
FIG. 48 is a side sectional view of a filter cartridge with a reinforced flanged tri-clamp adapter according to a further embodiment of the disclosure.
Figure 49:
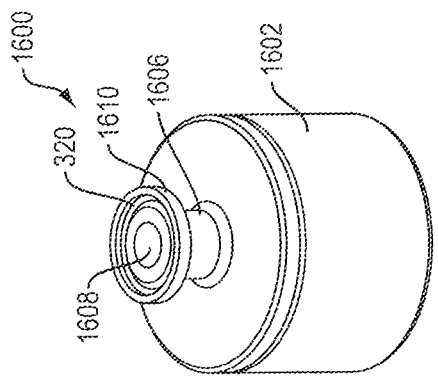
FIG. 49 is a top perspective view of the filter cartridge shown in FIG. 48.
Figure 50:
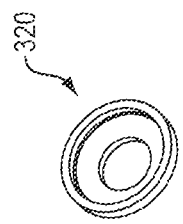
FIG. 50 is a top perspective view of the flange insert according to the embodiment shown in FIG. 48.
Figure 51:
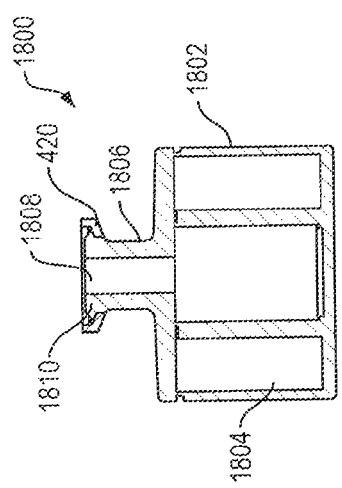
FIG. 51 is a side sectional view of a filter cartridge with a reinforced flanged tri-clamp adaptor according to yet another embodiment of the disclosure.
Figure 52:
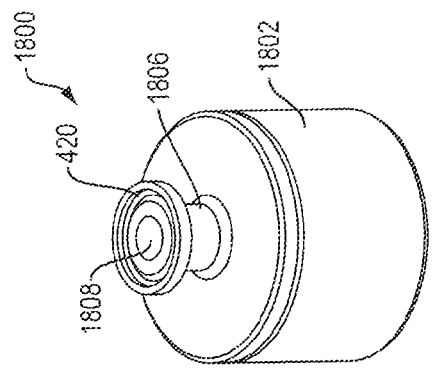
FIG. 52 is a top perspective view of the filter cartridge shown in FIG. 51.
Figure 53:
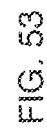
FIG. 53 is a top perspective view of the flange insert according to the embodiment shown in FIG. 51.
Figure 54:
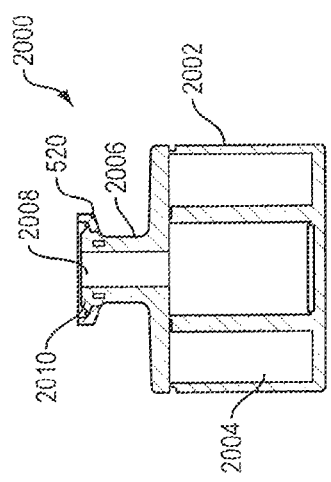
FIG. 54 is a side sectional view of a filter cartridge with a reinforced flanged tri-clamp adapter according to still another embodiment of the disclosure.
Figure 56:
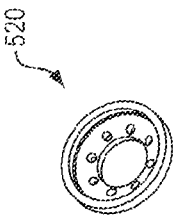
FIG. 56 is a top perspective view of the flange insert according to the embodiment shown in FIG. 54.
Figure 55:
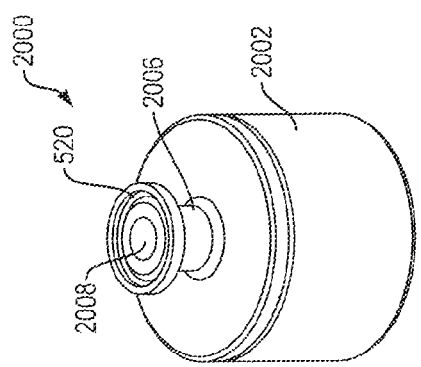
FIG. 55 is a top perspective view of the filter cartridge shown in FIG. 54.
Figure 62:
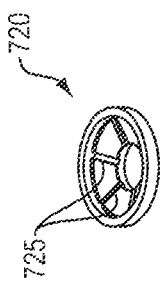
FIG. 62 is a top perspective view of the flange insert according to the embodiment shown in FIG. 60.
Figure 60:
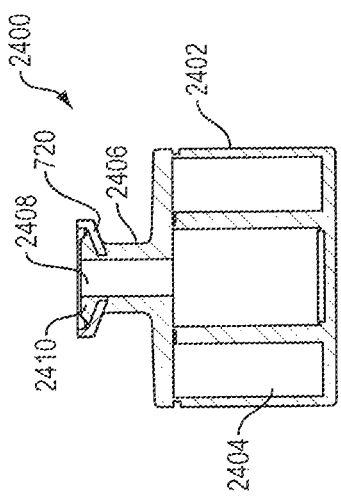
FIG. 60 is a side sectional view of a filter cartridge with a reinforced flanged tri-clamp adapter according to a yet further embodiment of the disclosure.
Figure 61:
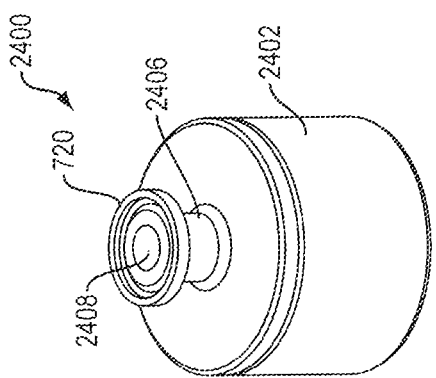
FIG. 61 is a top perspective view of the filter cartridge shown in FIG. 60.

It should be understood that insert 720 with ridges and/or channels may also be incorporated into the flanged portion of a filter housing port such as shown in FIGS. 42-44 and provide the same reinforcing function provided to flange 704 of flanged tube 700. As shown in FIGS. 42-44, a filter housing or capsule shown designated generally as 1300 includes a housing body 1302 that defines a filter-holding chamber 1304. A filter or filter medium 1305 enclosed in chamber 1304 may include: a) internal pleated cartridges, including single or multilayer membrane(s) or media; b) internal stacked-disc cartridges, including single or multilayer membrane(s) or media; c) internal combination filter medium, e.g., pleated or stacked cartridge(s) in combination with activated carbon (AC) filled in any void space not occupied by the cartridge(s); and d) filtration or purification media. e.g. AC, ion exchange resins, or other functional resins for the purification of fluids well known in the art.

At least one port 1306 extends from housing body 1302 and defines a port lumen 1308 in fluid communication with chamber 1304. An end of port 1306 distal from housing body 1302 is formed with a radially extending flange 1310. Insert 720 is secured in the port 1306/flange 1310 subassembly in the same spatial orientation and manner as shown and described with respect to securing insert 720 in flanged tube 700. The same materials and methods described for forming the combination of flanged tube 700 and insert 720 apply equally with respect to the formation of flanged port 1306 and insert 720.

It should be further understood that insert 720 may be incorporated into any flanged pipe or standalone flanged fitting in the same manner as described for incorporating insert 720 into flanged tube 700. The same materials and methods described for forming the combination of flanged tube 700 and insert 720 apply equally with respect to the formation of a flanged pipe or standalone flanged fitting and insert 720.

Insert 720 also may be incorporated into a cartridge filter, or a disc capsule filter such as shown in FIGS. 60-62 and 78-80, respectively, and provide the same reinforcing function provided to flange 704 of flanged tube 700. With respect to cartridge filters, referring now specifically to FIGS. 60-62, a filter cartridge/tri-clamp adaptor assembly shown designated generally as 2400 includes a filter cartridge body 2402 having a tri-clamp flange adapter 2406 formed on, or secured to, an end of cartridge filter body 2402. Adapter 2406 defines a lumen 2408 in fluid communication with a filter securing frame 2504 defined by body 2402. Securing frame 2404 is configured to receive and hold one or more filters (not shown, but disclosed herein with respect to other aspects of the disclosure) for incorporation into a larger assembly.

An end of port 2406 distal from body 2402 is formed with a radially extending flange 2410. Insert 720 is secured in the adapter 2406/flange 2410 subassembly in the same spatial orientation and manner as shown and described with respect to securing insert 720 in flanged tube 700. The same materials and methods described for forming the combination of flanged tube 700 and insert 720 apply equally with respect to the formation of flanged port 2406 and insert 720.

Figure 80:
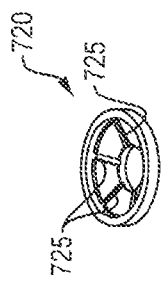
FIG. 80 is a top perspective view of the flange insert according to the embodiment shown in FIG. 78.
Figure 78:
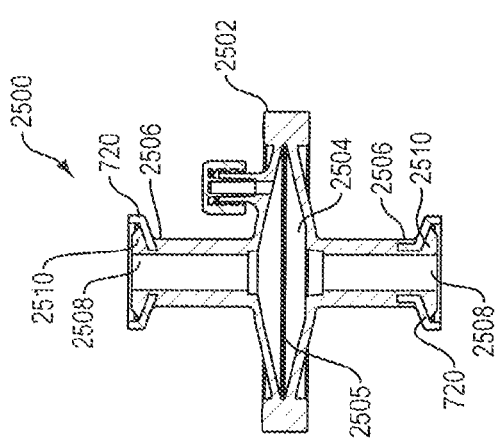
FIG. 78 is a side sectional view of a disc capsule filter with a reinforced flanged tri-clamp adapter according to a still further embodiment of the disclosure.
Figure 79:
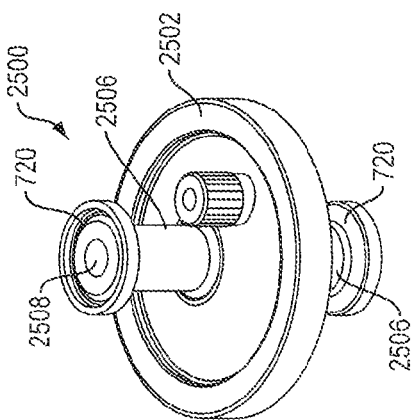
FIG. 79 is a top perspective view of the disc capsule filter shown in FIG. 78.

With respect to disc capsule filters, referring specifically to FIGS. 78-80, a disc capsule filter/flange assembly shown designated generally as 2500 includes a disc capsule body 2502 having a tri-clamp flange adapter 2506 formed on, or secured to, an end of capsule body 2502. Body 2502 defines a filter chamber 2504 that houses one or more disc filter(s) 2505 that may be constructed from single or multilayer membrane(s) and/or media discs. Adapter 2506 defines a lumen 2508 in fluid communication with the internal chamber of body 2502. An end of adapter 2506 distal from body 2502 is formed with a radially extending flange 2510. Insert 720 is secured in the adapter 2506/flange 2510 subassembly in the same spatial orientation and manner as shown and described with respect to securing insert 720 in flanged tube 700. The same materials and methods described for forming the combination of flanged tube 700 and insert 720 apply equally with respect to the formation of flanged port 2506 and insert 720.

Materials suitable for constructing any of the disclosed metallic-based inserts include various grades of stainless steel including, but not limited to, 316L, 316 and 304 as well as aluminum, copper, titanium and Inconel. Materials suitable for polymer-based inserts include, but are not limited to, polysulfone, PEEK and other rigid engineering grade plastics including reinforced versions reinforced by titanium dioxide, alumina and glass fiber as illustrative examples. The material selected should be able to withstand 3N or higher clamping forces with ISO standard tri-clamp configurations under various autoclaving conditions at standard or extended time, e.g., 121° C. for greater than or equal to 30 minutes to about four hours at 127° C. for greater than or equal to 30 minutes to four hours. Polymer-based flanges can be made from injection molding grade plastics, including, but not limited to, Polypropylene, Polyethylene, Nylon, Polyvinylidene fluoride, PFA, FEP, ECTFE, Polyester and polysulfone.

While the present disclosure has been described in connection with several embodiments thereof, it will be apparent to those skilled in the art that many changes and modifications may be made without departing from the true spirit and scope of the present disclosure. For example, the flanged tube embodiments disclosed herein are equally applicable to filter housing fittings in which the reinforced flange is part of a port or tube extending from, and in fluid communication with interior portions of, the filter housing. The reinforced flanges are also applicable to any tubular, flanged stand-alone fitting that may be secured to a larger assembly. Accordingly, it is intended by the appended claims to cover all such changes and modifications as come within the true spirit and scope of the disclosure.

What I claim as new and desire to secure by United States Letters Patent is:

1. A tri-clamp assembly comprising:
    a first tube having a first radially extended flanged end, wherein the first tube and first flanged end define a first lumen, wherein the first lumen has a defined diameter;
    a first flange insert secured in or about the first flanged end, wherein the first flange insert has a first tube receiving portion, wherein material used to form the first tube is overmolded over the first tube receiving portion, and wherein the material is superposed about the first tube receiving to create mechanically locked registration surfaces between the first tube and the first flange insert;
    a second tube having a second radially extended flanged end, wherein the second tube and second flanged end define a second lumen, wherein the second lumen has a defined diameter;
    a second flange insert secured in or about the second flange end, wherein the second flange insert has a second tube receiving portion, wherein material used to form the second tube is overmolded over the second tube receiving portion, and wherein the material is superposed about the second tube receiving portion to create mechanically locked registration surfaces between the second tube and the second flange insert; and,
    a clamp subassembly comprising a first clamp segment and a second clamp segment, wherein each segment has a first end and a second end, wherein the first ends are secured together in a hinged configuration to permit the segments to rotate about a hinge pin, wherein the second ends have corresponding clamp locking segments configured to permit the second ends to be secured together, wherein the flanges of the first tube and the second tube are registered and secured together by securing the second ends of the first and second clamp segments.

2. The tri-clamp assembly of claim 1 wherein at least one of the first and second flange inserts is metallic or polymer-based and comprises a substantially circular body being generally planar or frustoconical in cross-section, wherein the circular body has a substantially annular, axially extending perimeter shoulder, wherein a portion of the circular body is at least one of the first or second tube receiving portions that further defines a central insert bore, wherein the bore can have any regular or irregular geometric shape.

3. The tri-clamp assembly of claim 2 wherein the central insert bore has a diameter greater than, or equal to, the diameter of at least one of the first and second lumens.

4. The tri-clamp assembly of claim 2 wherein the central bore has a diameter greater than the diameter of at least one of the first and second lumens, and wherein the material used to form at least one of the first and second tubes is overmolded over the portion of the circular body defining the central bore, wherein the material is present on a top surface and on a bottom surface of the circular body as well as superposed about, and in registration with, the portion defining the central bore, wherein the material above and below the circular body is connected together by the material superposed about, and in registration with, the portion defining the central bore, and wherein the overmolded material defines part of the first and/or second lumens.

5. The tri-clamp assembly of claim 4 wherein the material used to form at least one of the first and second tubes is overmolded over at least a portion of a radially outer, substantially annular edge of the perimeter shoulder.

6. The tri-clamp assembly of claim 4 wherein the overmolded material is configured to form a tri-clamp gasket registration surface.

7. The tri-clamp assembly of claim 6 wherein the overmolded material is further configured to define a substantially annular gasket-receiving channel.

8. The tri-clamp assembly of claim 7 further comprising a tri-clamp gasket having a substantially planar gasket body with portions defining a perimeter rim, wherein the rim extends axially away from the gasket body in both axial directions, and wherein the rim registers against the gasket-receiving channel and the gasket body registers against the gasket registration surface.

9. The tri-clamp assembly of claim 6 wherein the overmolded material in combination with portions of at least one of the first and second tube flanged ends define a substantially annular gasket-receiving channel.

10. The tri-clamp assembly of claim 9 further comprising a tri-clamp gasket having a substantially planar gasket body with portions defining a perimeter rim, wherein the rim extends axially away from the gasket body in both axial directions, and wherein the rim registers against the gasket-receiving channel and the gasket body registers against the gasket registration surface.

11. The tri-clamp assembly of claim 2 wherein at least one of the first and second flange inserts further comprises at least one secondary bore formed in the circular body between the central insert bore and the perimeter shoulder.

12. The tri-clamp assembly of claim 11 wherein the material used to form at least one of the first and second tubes is overmolded over the portion of the circular body defining the central bore and present in the at least one secondary bore, wherein the material is on a top surface and on a bottom surface of the circular body as well as superposed about, and in registration with, the portion defining the central bore, wherein the material above and below the circular body is connected together by the material in the at least one secondary bore and the material superposed about, and in registration with, the portion defining the central bore, and wherein the overmolded material defines part of the first and/or second lumens.

13. The tri-clamp assembly of claim 2 wherein the circular body of at least one of the first and second flange inserts has portions defining at least one geometrically irregular cutout configured to disrupt the generally continuous shape of the central bore.

14. The tri-clamp assembly of claim 13 wherein the material used to form at least one of the first and second tubes is overmolded over the portions of the circular body defining the central bore and the geometrically irregular cutout, wherein the material is present on a top surface and on a bottom surface of the circular body as well as superposed about, and in registration with, the portion defining the central bore and the portion defining the at least one irregular cutout, wherein the material above and below the circular body is connected together by the material superposed about, and in registration with, the portion defining the central bore and the portion defining the irregular cutout, and wherein the overmolded material defines part of the first and/or second lumens.

15. The tri-clamp assembly of claim 2 wherein the circular body of at least one of the first and second flange inserts has portions defining at least one axially extended post extending from a bottom surface of the circular body.

16. The tri-clamp assembly of claim 15 wherein the at least one axially extended post may have any regular or irregular geometric shape in cross-section.

17. The tri-clamp assembly of claim 16 wherein the material used to form at least one of the first and second tubes is overmolded over the portions of the circular body defining the central bore and the at least one post wherein the material is present on a top surface and on a bottom surface of the circular body as well as superposed about, and in registration with, the portion defining the central bore and the at least one post, wherein the material above and below the circular body is connected together at least by the material superposed about, and in registration with, the portion defining the central bore, and wherein the overmolded material defines part of the first and/or second lumens.

18. The tri-clamp assembly of claim 2 wherein the circular body of at least one of the first and second flange inserts has portions defining at least one ridge or channel formed on a bottom and/or a top surface of the circular body to define a corrugated surface.

19. The tri-clamp assembly of claim 18 wherein the at least one ridge or channel radially extends at least part of the distance between the central bore and the perimeter shoulder.

20. The tri-clamp assembly of claim 19 wherein the material used to form at least one of the first and second tubes is overmolded over the portions of the circular body defining the central bore and the at least one ridge or channel wherein the material is present on a top surface and on a bottom surface of the circular body as well as superposed about, and in registration with, the portion defining the central bore and the at least one ridge, or channel wherein the material above and below the circular body is connected together at least by the material superposed about, and in registration with, the portion defining the central bore, and wherein the overmolded material defines part of the first and/or second lumens.

21. A tube comprising:
 a tube body having a first radially extended flanged end, wherein the tube body and the flanged end define a lumen, wherein the lumen has a defined diameter; and, a flange insert secured in or about the flanged end, wherein the flange insert has a flanged end receiving portion, wherein material used to form the tube body and the flanged end is overmolded over the flanged end receiving portion, and wherein the material is superposed about the flanged end receiving portion to create mechanically locked registration surfaces between the flanged end and the flange insert.

22. The tube of claim 21 wherein the flange insert is metallic or polymer-based and comprises a substantially circular body being generally planar or frustoconical in cross-section, wherein the circular body has a substantially annular, axially extending perimeter shoulder, wherein a portion of the circular body is the flanged end receiving portion that further defines a central insert bore, wherein the bore can have any regular or irregular geometric shape.

23. The tube of claim 22 wherein the central insert bore has a diameter greater than, or equal to, the diameter of the lumen.

24. The tube of claim 22 wherein the central bore has a diameter greater than the diameter of the lumen, and wherein the material used to form the tube body and flanged end is overmolded over the portion of the circular body defining the central bore, wherein the material is present on a top surface and on a bottom surface of the circular body as well as superposed about, and in registration with, the portion defining the central bore, wherein the material above and below the circular body is connected together by the material superposed about, and in registration with, the portion defining the central bore, and wherein the overmolded material defines part of the lumen.

25. The tube of claim 24 wherein the material used to form the tube body and flanged end is overmolded over at least a portion of a radially outer, substantially annular edge of the perimeter shoulder.

26. The tube of claim 24 wherein the overmolded material is configured to form a gasket registration surface.

27. The tube of claim 26 wherein the overmolded material is further configured to define a substantially annular gasket-receiving channel.

28. The tube of claim 27 further comprising a gasket having a substantially planar gasket body with portions defining a perimeter rim, wherein the rim extends axially away from the gasket body in at least one axial direction, and wherein the rim registers against the gasket-receiving channel and the gasket body registers against the gasket registration surface.

29. The tube of claim 26 wherein the overmolded material in combination with a portion of the tube flanged end define a substantially annular gasket-receiving channel.

30. The tube of claim 29 further comprising a gasket having a substantially planar gasket body with portions defining a perimeter rim, wherein the rim extends axially away from the gasket body in at least one axial direction, and wherein the rim registers against the gasket-receiving channel and the gasket body registers against the gasket registration surface.

31. The tube of claim 22 wherein the flange insert further comprises at least one secondary bore formed in the circular body between the central insert bore and the perimeter shoulder.

32. The tube of claim 31 wherein the material used to form the tube body and flanged end is overmolded over the portion of the circular body defining the central bore and present in the at least one secondary bore, wherein the material is present on a top surface and on a bottom surface of the circular body as well as superposed about, and in registration with, the portion defining the central bore, wherein the material above and below the circular body is connected together by the material in the at least one secondary bore and the material superposed about, and in registration with, the portion defining the central bore, and wherein the overmolded material defines part of the lumen.

33. The tube of claim 22 wherein the circular body of the flange insert has portions defining at least one geometrically irregular cutout configured to disrupt the generally continuous shape of the central bore.

34. The tube of claim 33 wherein the material used to form the tube body and flanged end is overmolded over the portions of the circular body defining the central bore and the geometrically irregular cutout, wherein the material is present above and below the plane occupied by the circular body as well as superposed about, and in registration with, the portion defining the central bore and the portion defining the at least one irregular cutout, wherein the material above and below the circular body is connected together by the material superposed about, and in registration with, the portion defining the central bore and the portion defining the irregular cutout, and wherein the overmolded material defines part of the lumen.

35. The tube of claim 32 wherein the circular body of flange insert has portions defining at least one axially extended post extending from a bottom surface of the circular body.

36. The tube of claim 35 wherein the at least one axially extended post may have any regular or irregular geometric shape in cross-section.

37. The tube of claim 36 wherein the material used to form the tube body and flanged end is overmolded over the portions of the circular body defining the central bore and the at least one post wherein the material is present on a top surface and on a bottom surface of the circular body as well as superposed about, and in registration with, the portion defining the central bore and the at least one post, wherein the material above and below the circular body is connected together at least by the material superposed about, and in registration with, the portion defining the central bore, and wherein the overmolded material defines part of the lumen.

38. The tube of claim 32 wherein the circular body the tube body and flanged end has portions defining at least one ridge or channel formed on a bottom and/or a top surface of the circular body to define a corrugated surface.

39. The tube of claim 38 wherein the at least one ridge extends at least part of the distance between the central bore and the perimeter shoulder.

40. The tube of claim 39 wherein the material used to form the tube body and flanged end is overmolded over the portions of the circular body defining the central bore and the at least one ridge wherein the material is present on a top surface and on a bottom surface of the circular body as well as superposed about, and in registration with, the portion defining the central bore and the at least one ridge, wherein the material above and below the circular body is connected together at least by the material superposed about, and in registration with, the portion defining the central bore, and wherein the overmolded material defines part of the first and/or second lumens.

41. A filter housing or capsule comprising:
a filter housing body defining a filter holding chamber;
at least one port formed on, or attached to, the filter housing, wherein the at least one port defines a lumen in fluid communication with the filter holding chamber, and wherein the port has portions defining a flanged end distal from the housing body; and,
a flange insert secured in or about the port flanged end, wherein the flange insert has a flanged end receiving portion, wherein material used to form the at least one port and flanged end is overmolded over the flanged end receiving portion, and wherein the material is superposed about the flanged end receiving portion to create mechanically locked registration surfaces between the flanged end and the flange insert.

42. The filter housing of claim 41 wherein the flange insert is metallic or polymer-based and comprises a substantially circular body being generally planar or frustoconical in cross-section, wherein the circular body has a substantially annular, axially extending perimeter shoulder, wherein a portion of the circular body is the flanged end receiving portion that further defines a central insert bore, wherein the bore can have any regular or irregular geometric shape.

43. The filter housing of claim 42 wherein the central insert bore has a diameter greater than, or equal to, the diameter of the lumen.

44. The filter housing of claim 42 wherein the central bore has a diameter greater than the diameter of the lumen, and wherein the material used to form the port body and flanged end is overmolded over the portion of the circular body defining the central bore, wherein the material is present on a top surface and on a bottom surface of the circular body as well as superposed about, and in registration with, the portion defining the central bore, wherein the material above and below the circular body is connected together by the material superposed about, and in registration with, the portion defining the central bore, and Therein the overmolded material defines part of the lumen.

45. The filter housing of claim 44 wherein the material used to form the port body and flanged end is overmolded over at least a portion of a radially outer, substantially annular edge of the perimeter shoulder.

46. The filter housing of claim 44 wherein the overmolded material is configured to form a gasket registration surface.

47. The filter housing of claim 46 wherein the overmolded material is further configured to define a substantially annular gasket-receiving channel.

48. The filter housing of claim 47 further comprising a gasket having a substantially planar gasket body with portions defining a perimeter rim, wherein the rim extends axially away from the gasket body in at least one axial direction, and wherein the rim registers against the gasket-receiving channel and the gasket body registers against the gasket registration surface.

49. The filter housing of claim 46 wherein the overmolded material in combination with a portion of the tube flanged end define a substantially annular gasket-receiving channel.

50. The filter housing of claim 49 further comprising a gasket having a substantially planar gasket body with portions defining a perimeter rim, wherein the rim extends axially away from the gasket body in at least one axial direction, and wherein the rim registers against the gasket-receiving channel and the gasket body registers against the gasket registration surface.

51. The filter housing of claim 42 wherein the flange insert further comprises at least one secondary bore formed in the circular body between the central insert bore and the perimeter shoulder.

52. The filter housing of claim 51 wherein the material used to form the port body and flanged end is overmolded over the portion of the circular body defining the central bore and present in the at least one secondary bore, wherein the material is present on a top surface and on a bottom surface of the circular body as well as superposed about, and in registration with, the portion defining the central bore, wherein the material above and below the circular body is connected together by the material in the at least one secondary bore and the material superposed about, and in registration with, the portion defining the central bore, and wherein the overmolded material defines part of the lumen.

53. The filter housing of claim 42 wherein the circular body of the flange insert has portions defining at least one geometrically irregular cutout configured to disrupt the generally continuous shape of the central bore.

54. The filter housing of claim 53 wherein the material used to form the port body and flanged end is overmolded over the portions of the circular body defining the central bore and the geometrically irregular cutout, wherein the material is present above and below the plane occupied by the circular body as well as superposed about, and in registration with, the portion defining the central bore and the portion defining the at least one irregular cutout, wherein the material above and below the circular body is connected together by the material superposed about, and in registration with, the portion defining the central bore and the portion defining the irregular cutout, and wherein the overmolded material defines part of the lumen.

55. The filter housing of claim 42 wherein the circular body of flange insert has portions defining at least one axially extended post extending from a bottom surface of the circular body.

56. The filter housing of claim 55 wherein the at least one axially extended post may have any regular or irregular geometric shape in cross-section.

57. The filter housing of claim 56 wherein the material used to form the port body and flanged end is overmolded over the portions of the circular body defining the central bore and the at least one post wherein the material is present on a top surface and on a bottom surface of the circular body as well as superposed about, and in registration with, the portion defining the central bore and the at least one post, wherein the material above and below the circular body is connected together at least by the material superposed about, and in registration with, the portion defining the central bore, and wherein the overmolded material defines part of the lumen.

58. The filter housing of claim 42 wherein the circular body the port body and flanged end has portions defining at least one ridge or channel formed on a bottom and/or a top surface of the circular body to define a corrugated surface.

59. The filter housing of claim 58 wherein the at least one ridge extends at least part of the distance between the central bore and the perimeter shoulder.

60. The filter housing of claim 59 wherein the material used to form the port body and flanged end is overmolded over the portions of the circular body defining the central bore and the at least one ridge wherein the material is present on a top surface and on a bottom surface of the circular body as well as superposed about, and in registration with, the portion defining the central bore and the at least one ridge, wherein the material above and below the circular body is connected together at least by the material superposed about, and in registration with, the portion defining the central bore, and wherein the overmolded material defines part of the first and/or second lumens.

61. The filter housing of claim 41 further comprising a filter or filter media secured in the filter holding chamber, wherein the filter or filter media is selected from the group consisting of single or multilayer membrane(s) or media disc(s): internal pleated cartridges including single or multilayer membrane(s) or media; combination filter media including pleated or stacked filter cartridges combined with activated carbon; purification media including activated carbon, ion exchange resins and functional purification resins and combinations thereof.

62. The filter housing of claim 42 further comprising a filter or filter media secured in the filter holding chamber, wherein the filter or filter media is selected from the group consisting of single or multilayer membrane(s) or media disc(s); internal pleated cartridges including single or multilayer membrane(s) or media; combination filter media including pleated or stacked filter cartridges combined with activated carbon; purification media including activated carbon, ion exchange resins and functional purification resins and combinations thereof.

63. A filter cartridge assembly comprising:
a filter cartridge defining a filter holding chamber;
at least one filter secured in the holding chamber;
at least one tri-clamp adapter formed on, or attached to, the filter cartridge, wherein the at least adapter defines a lumen in fluid communication with the filter holding chamber, and wherein the adapter has portions defining a flanged end distal from the filter cartridge; and,
a flange insert secured in or about the adapter flanged end, wherein the flange insert has a flanged end receiving portion, wherein material used to form the at least one tri-clamp adapter and flanged end is overmolded over the flanged end receiving portion, and wherein the material is superposed about the flanged end receiving portion to create mechanically locked registration surfaces between the flanged end and the flange insert.

64. The filter cartridge of claim 63 wherein the flange insert is metallic or polymer-based and comprises a substantially circular body being generally planar or frustoconical in cross-section, wherein the circular body has a substantially annular, axially extending perimeter shoulder, wherein a portion of the circular body is the flanged end receiving portion that further defines a central insert bore, herein the bore can have any regular or irregular geometric shape.

* * * * *